US010429696B2

(12) United States Patent
Kim et al.

(10) Patent No.: US 10,429,696 B2
(45) Date of Patent: Oct. 1, 2019

(54) LIQUID CRYSTAL DISPLAY

(71) Applicant: Samsung Display Co., Ltd., Yongin-si, Gyeonggi-do (KR)

(72) Inventors: Jong-Keun Kim, Seoul (KR); Min Wook Park, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/065,721

(22) Filed: Mar. 9, 2016

(65) Prior Publication Data

US 2017/0052397 A1    Feb. 23, 2017

(30) Foreign Application Priority Data

Aug. 17, 2015  (KR) .................... 10-2015-0115557

(51) Int. Cl.
*G02F 1/1337* (2006.01)
*G02F 1/1339* (2006.01)
*G02F 1/1335* (2006.01)

(52) U.S. Cl.
CPC .. *G02F 1/133707* (2013.01); *G02F 1/133512* (2013.01); *G02F 2001/13398* (2013.01); *G02F 2001/133742* (2013.01); *G02F 2201/121* (2013.01); *G02F 2201/122* (2013.01); *G02F 2201/128* (2013.01); *G02F 2201/40* (2013.01)

(58) Field of Classification Search
CPC ............. G02F 1/1339; G02F 1/134309; G02F 1/13394; G02F 1/1337; G02F 2001/13398; G02F 2001/133757; G02F 1/133753; G02F 1/133707; G02F 1/133512; G02F 1/136209; G02F 1/1341; G02F 1/133377
See application file for complete search history.

(56) References Cited

U.S. PATENT DOCUMENTS

| 6,266,122 B1 * | 7/2001 | Kishimoto | G02F 1/133377 349/156 |
| 2002/0149730 A1 * | 10/2002 | Jeong | G02F 1/1339 349/153 |

(Continued)

FOREIGN PATENT DOCUMENTS

| JP | 2006-106137 A | 4/2006 |
| KR | 10-2007-0045718 A | 5/2007 |

(Continued)

*Primary Examiner* — Paisley L Arendt
*Assistant Examiner* — Mariam Qureshi
(74) *Attorney, Agent, or Firm* — Innovation Counsel LLP

(57) ABSTRACT

A liquid crystal display according to an exemplary embodiment of the present disclosure includes: a first substrate including a plurality of unit regions positioned at a display area in a plan view; a liquid crystal layer opposing the first substrate; a unit electrode portion positioned on a first surface of the first substrate at one unit region; a lower dam positioned at a peripheral area positioned around the display area in the plan view; and a protrusion positioned corresponding to the unit region in the plan view. The lower dam and protrusion are positioned between the first substrate and the liquid crystal layer and protruded toward the liquid crystal layer. The protrusion enclosing a portion around the unit region with respect to a center of the unit region in the plan view. The lower dam and the protrusion are positioned at a same layer and include the same material.

20 Claims, 30 Drawing Sheets

(56) References Cited

U.S. PATENT DOCUMENTS

| | | | |
|---|---|---|---|
| 2005/0068482 A1* | 3/2005 | Kume | G02F 1/133707 349/130 |
| 2005/0073638 A1* | 4/2005 | Byun | G02F 1/1337 349/156 |
| 2008/0002129 A1* | 1/2008 | Joo | G02F 1/133707 349/144 |
| 2009/0066903 A1* | 3/2009 | Yoshida | G02F 1/1339 349/153 |
| 2009/0073361 A1* | 3/2009 | Yagi | G02F 1/133707 349/124 |
| 2010/0103354 A1* | 4/2010 | Yu | G02F 1/136209 349/106 |
| 2011/0124153 A1* | 5/2011 | Hosoba | H01L 21/02554 438/104 |
| 2014/0226112 A1* | 8/2014 | Kim | G02F 1/133305 349/96 |
| 2015/0055069 A1* | 2/2015 | Cheng | G02F 1/133707 349/123 |
| 2015/0370116 A1* | 12/2015 | Chae | G02F 1/13394 349/43 |
| 2016/0011474 A1* | 1/2016 | Park | G02F 1/136213 349/43 |
| 2017/0146862 A1* | 5/2017 | Ma | G02F 1/133723 |

FOREIGN PATENT DOCUMENTS

| | | |
|---|---|---|
| KR | 10-1096687 | 12/2011 |
| KR | 10-2013-0101325 A | 9/2013 |
| KR | 10-2015-0012093 A | 2/2015 |

* cited by examiner

LIQUID CRYSTAL DISPLAY

CROSS-REFERENCE TO RELATED APPLICATION

This application claims priority to and the benefit of Korean Patent Application No. 10-2015-0115557 filed in the Korean Intellectual Property Office on Aug. 17, 2015, the entire contents of which are incorporated herein by reference.

BACKGROUND (a) Technical Field

The present disclosure relates to a display device. More particularly, the present disclosure relates to a vertical alignment (VA) mode liquid crystal display.

(b) Description of the Related Art

A display device, such as a liquid crystal display (LCD) and an organic light diode display, generally includes a display panel including a plurality of pixels as a unit displaying an image.

The display panel of a liquid crystal display generally includes a liquid crystal layer of liquid crystal molecules, a field generating electrode configured to control the alignment of the liquid crystal molecules of the liquid crystal layer, a plurality of signal lines configured to apply a voltage to at least a portion of the field generating electrode, and a plurality of switching element connected thereto. When a voltage is applied to the field generating electrode, an electric field is generated in the liquid crystal layer such that the liquid crystal molecules are rearranged, thereby controlling the amount of light transmitted by the liquid crystal layer to display an image. To control the amount of the transmitted light, the display panel may include at least one polarizer.

The field generating electrode included in the liquid crystal display includes a pixel electrode applied with a data voltage and an opposed electrode applied with a common voltage. The pixel electrode may be applied with the data voltage through a switching element, which may be a thin film transistor. The pixel electrode and the opposed electrode may be positioned on opposite sides of the liquid crystal layer, or may be positioned on the same side with respect to the liquid crystal layer.

The liquid crystal display may have a vertical alignment (VA) mode in which long axes of the liquid crystal molecules are aligned almost vertical to the surface of the display panel in the absence of an electric field to the liquid crystal layer. The liquid crystal display of the vertical alignment (VA) mode may easily realize a large contrast ratio and a wide reference viewing angle compared with other modes.

In the vertical alignment (VA) mode liquid crystal display, to realize the wide viewing angle, a plurality of sub-regions or domains having different alignment directions of the liquid crystal molecules may be formed in one pixel. As one example of forming the plurality of domains in one pixel, there is a method of forming cutouts of minute slits in the field generating electrodes. If the cutouts are formed in the field generating electrode, a fringe field is generated at an edge of the cutout, thereby rearranging the liquid crystal molecules to form the plurality of domains by.

The liquid crystal display has a structure in which a plurality of layers are deposited, and an exposure process using a photomask is used to form a pattern of each layer.

To define an initial alignment of the liquid crystal molecules of the liquid crystal display, an alignment layer is positioned on an inner surface opposing the liquid crystal layer among surfaces of the display panel. For example, the alignment layer may be formed by coating the alignment layer on the inner surface of the display panel. However, control of the alignment layer at the edge thereof is not easy because the aligning agent may spread in a plan view. If the edge of the region where the alignment layer is formed is not controlled, a sealant adhering two panels including the display panel may contact the alignment layer, or a region where the alignment layer is not coated may be generated on the display area displaying the image. If the alignment layer contacts the sealant, adherence of the sealant is weak, absorption is generated such that reliability is decreased, and resistance of an electrical short point may be increased between two panels. When the alignment layer is not coated on the edge portion of the display area, the initial alignment of the liquid crystal molecules is not defined such that a display defect is generated. These problems may be prevented if a margin of the region where the alignment layer is formed is increased such that a distance between the display area and the sealant is far and a non-display area of the edge of the display device may be widened.

The above information disclosed in this Background section is only for enhancement of understanding of the background of the disclosure and therefore may contain information that does not form the prior art that is already known in this country to a person of ordinary skill in the art.

SUMMARY

The present system and method increase a liquid crystal alignment control force and transmittance of a liquid crystal display. Further, the formation region of the alignment layer is controlled by controlling the spread of the aligning agent in the formation process of the alignment layer, and a manufacturing process is simplified by reducing a number of photomasks used in the manufacturing process of the liquid crystal display to reduce the manufacture cost and the manufacture time.

A liquid crystal display according to an exemplary embodiment of the present disclosure includes: a first substrate including a plurality of unit regions positioned in a display area in a plan view; a liquid crystal layer opposing the first substrate and including a plurality of liquid crystal molecules; a unit electrode portion positioned on a first surface toward the liquid crystal layer among surfaces of the first substrate and positioned at one unit region; at least one lower dam positioned at a peripheral area that is positioned around the display area in the plan view, positioned between the first substrate and the liquid crystal layer, and protruded toward the liquid crystal layer; and a protrusion positioned corresponding to the unit region in the plan view, positioned between the first substrate and the liquid crystal layer, and protruded toward the liquid crystal layer, wherein the protrusion includes a portion enclosing at least a portion around the unit region with respect to a center of the one unit region in a plan view, and the lower dam and the protrusion are positioned at a same layer and include the same material.

The protrusion may include a first lateral surface obliquely inclined with respect to a bottom surface of the protrusion in a cross-sectional view, and the liquid crystal molecules positioned around the first lateral surface may be pretilted with respect to a normal direction of a surface of the first substrate.

The lower dam may include a first dam adjacent to the display area in the plan view and a second dam positioned between the first dam and an edge of the first substrate.

A first alignment layer positioned between the lower dam and the protrusion, and the liquid crystal layer, may be further included.

A spacer that is positioned at a same layer as the protrusion and the lower dam, includes a same material as the protrusion and the lower dam, and has a top surface that is higher than a top surface of the protrusion and the lower dam may be further included.

The protrusion, the lower dam, and the spacer may include a light blocking material.

A main light blocking portion having a top surface that is lower than the top surface of the spacer may be further included, and the main light blocking portion may be positioned at a same layer as the protrusion, the lower dam, and the spacer and include a same material as the protrusion, the lower dam, and the spacer.

A second substrate opposing the first substrate with the liquid crystal layer interposed therebetween; a sealant positioned between the first substrate and the second substrate and positioned in the peripheral area in the plan view; and at least one upper dam positioned in the peripheral area in the plan view, positioned between the second substrate and the liquid crystal layer, and protruded toward the liquid crystal layer may be further included.

A second alignment layer positioned between the upper dam and the liquid crystal layer may be further included.

A spacer that is positioned at a same layer as the upper dam, includes a same material as the upper dam, and has a top surface that is higher than a top surface of the upper dam may be further included.

A spacer that is positioned at a same layer as the protrusion and the lower dam, includes a same material as the protrusion and the lower dam, and has a top surface that is higher than a top surface of the protrusion and the lower dam, may be further included.

The protrusion may include a pair of transverse portions opposing each other with respect to the center of the unit electrode portion and respectively including a side parallel to the first direction, and a pair of longitudinal portions opposing each other with respect to the center of the unit electrode portion and respectively including a side parallel to a second direction crossing the first direction.

The protrusion may further include at least one corner portion including a first oblique side that is parallel to a direction that is oblique with respect to the first direction and the second direction in the plan view.

The cross-sectional lateral surface of the corner portion may form an angle of about 1 degree to about 2 degrees with a bottom surface of the protrusion.

The unit region may include a plurality of sub-regions in which the liquid crystal molecules are inclined in different directions from each other when an electric field is generated in the liquid crystal layer, the unit electrode portion may include a stem portion positioned at a boundary between adjacent sub-regions and a plurality of branch portions connected to the stem portion, and the branch portion may extend in a different direction from the first direction and the second direction.

The unit electrode portion may include at least one flat portion respectively positioned at at least one corner of the unit electrode portion.

The first substrate may have a curved surface.

A manufacturing method of a liquid crystal display according to an exemplary embodiment of the present disclosure includes: forming a plurality of thin film layers on a substrate; coating and exposing a photosensitive material on the plurality of thin film layers by using a photomask; and processing the exposed photosensitive material to form a protrusion positioned corresponding to one unit region of a display area and at least one lower dam positioned at a peripheral area around the display area, wherein the protrusion includes a portion enclosing along at least a portion around the unit region with respect to a center of the unit region in a plan view.

The photomask may include a first region corresponding to the protrusion, a second region corresponding to the lower dam, and a third region, and at least one light transmittance of the first region and the second region may be different from light transmittance of the third region.

The photomask may further include a fourth region having different light transmittance from the first region, the second region, and the third region, and in the step of forming the protrusion and the lower dam, a spacer corresponding to the fourth region may also be formed.

In the display device according to an exemplary embodiment of the present disclosure, the liquid crystal alignment control force and the transmittance may be increased. Further, the alignment layer formation region may be controlled by controlling the spread of the aligning agent in the formation process of the alignment layer, and the manufacturing cost and the manufacturing cost may be reduced, thereby simplifying the manufacturing process by reducing a number of photomasks used in the manufacturing process of the liquid crystal display.

DETAILED DESCRIPTION OF THE EMBODIMENTS

Figure 1:
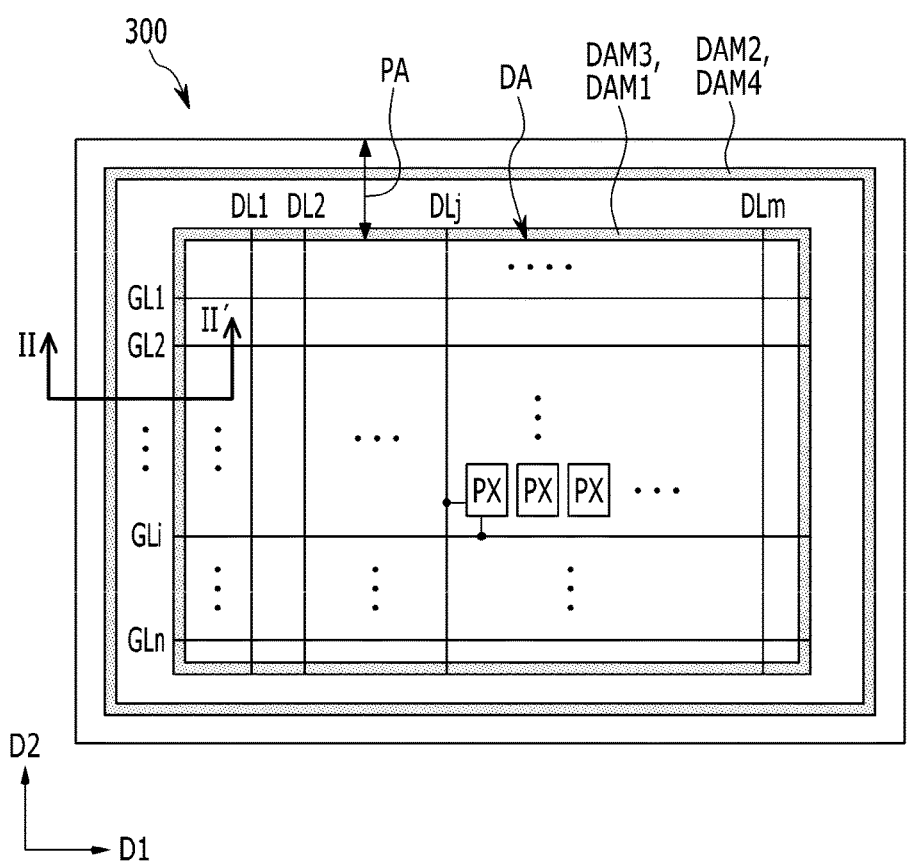
FIG. 1 is a layout view of a liquid crystal display according to an exemplary embodiment of the present disclosure.

The present system and method are described more fully hereinafter with reference to the accompanying drawings in which exemplary embodiments of the present system and method are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. When an element such as a layer, film, region, or substrate is referred to as being "on" another element, it may be directly on the other element, or intervening elements may also be present. In contrast, when an element is referred to as being "directly on" another element, there are no intervening elements present.

To clarify the present system and method, parts that are not germane to the description are omitted, and the same elements or equivalents are referred to with the same reference numerals throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and its variations, such as "comprises" or "comprising," imply the inclusion of stated elements but not the exclusion of any other elements.

First, a liquid crystal display according to an exemplary embodiment of the present disclosure is described with reference to FIG. 1 to FIG. 4.

Referring to FIG. 1, a liquid crystal display according to an exemplary embodiment of the present disclosure includes a display panel 300. In a view of a plane, the display panel 300 includes a display area DA where a plurality of pixels PX are arranged and a peripheral area PA positioned outside and surrounding the display area DA. Here, the view of the plane is to be observed on a position where the image displayed by the display panel 300 can be seen. Compared with this, a cross-section view is to see a cross-section of several layers configuring the display panel 300. This may be equally applied to the following description.

The plurality of pixels PX may be arranged in an approximate matrix shape but is not limited thereto.

The pixel PX as a region of the display panel 300 displaying the image for one image signal may display the image of a primary color such as red, green, and blue. The display of the various colors may be realized by controlling the luminance of the plurality of pixels PX representing the different colors.

One pixel PX may include at least one light transmission region where the light is relatively more transmitted and at least one light blocking region where the light is relatively less transmitted or completely blocked.

A plurality of signal lines connected to the pixel PX are positioned in the display area DA, and a portion of the signal lines may extend to the peripheral area PA.

The signal lines include a plurality of gate lines GL1-GLn transmitting a gate signal that turns on/off the switching element and a plurality of data lines DL1-DLm transmitting the data voltage. The gate lines GL1-GLn extend in a first direction D1 in the plan view, and the data lines DL1-DLm extend in a second direction D2 that is different from the first direction D1. The second direction D2 may be perpendicular to the first direction D1.

The display panel 300 may include at least one switching element positioned at the region corresponding to one pixel PX and at least one pixel electrode connected thereto. The switching element may include at least one thin film transistor connected to at least one data line DLj (j=1, 2, . . . , m) and at least one gate line GLi (i=1, 2, . . . , n). The thin film transistor is controlled depending on the gate signal transmitted by the gate line GLi such that the data voltage transmitted by the data line DLj may be transmitted to the pixel electrode.

The peripheral area PA may be included in the portion of the non-display area of the display panel 300. A plurality of driving circuits (not shown) configured to drive the pixel PX may be positioned in the peripheral area PA.

As shown in FIG. 1, at least one dam of DAM1, DAM2, DAM3, and DAM4 is positioned in the peripheral area PA. FIG. 1 shows dams DAM1, DAM2, DAM3, and DAM4 positioned at different distances from the display area DA; however the number of dams is not limited thereto, and one of the dams DAM1 and DAM2 may be omitted, and one of the dams DAM3 and DAM4 may be omitted.

The dams DAM1 and DAM3 are adjacent to the display area DA and extend along the periphery of the display area DA. The dams DAM1 and DAM3 include a portion enclosing most of the periphery of the display area DA, thereby forming a closed line; however it is not limited thereto, and one portion thereof may be opened, and they may be divided into a plurality of portions.

The dams DAM2 and DAM4 are positioned between the dams DAM1 and DAM3 and the edge of the display panel 300. The dams DAM2 and DAM4 include a portion enclosing most of the periphery of the dams DAM1 and DAM3 to be a closed line; however it is not limited thereto, and one portion thereof may be opened, and they may be divided into a plurality of portions.

Other dams (not shown) may be further positioned between the dams DAM1 and DAM3, and the dams DAM2 and DAM4, or in the peripheral area PA outside the dams DAM2 and DAM4.

Figure 2:
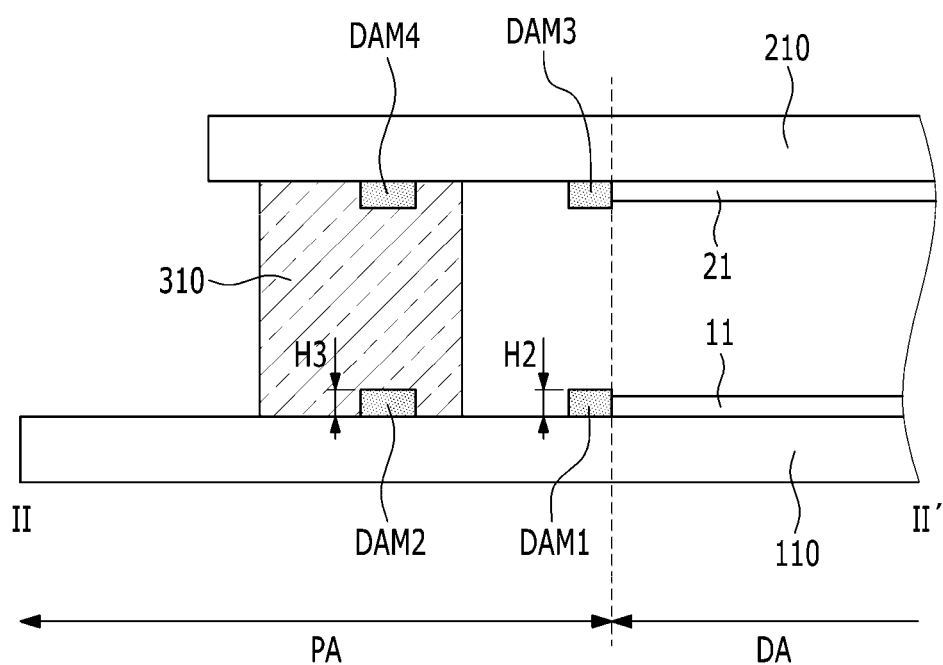
FIG. 2 is a cross-sectional view of the liquid crystal display shown in FIG. 1 taken along a line II-II'.

Referring to FIG. 2, in the cross-section of the display panel 300, the display panel 300 includes a lower panel and an upper panel opposing each other and a liquid crystal layer 3 positioned therebetween. The lower panel includes a lower substrate 110, the upper panel includes an upper substrate 210, and the liquid crystal layer 3 includes a plurality of liquid crystal molecules.

A sealant 310 is positioned between the lower panel and the upper panel. The sealant 310 combines the lower panel and the upper panel to be fixed and seals the liquid crystal layer 3. The sealant 310 is formed along an edge circumference of the lower substrate 110 and the upper substrate 210, and particularly may be positioned adjacent to the edge of one substrate (e.g., the upper substrate 210). The sealant 310 may include a conductive ball (not shown) having a conductivity.

The liquid crystal molecules may be initially aligned to be approximately perpendicular to the surfaces of the substrates 110 and 210. For this, alignment layers 11 and 21 are positioned on at least one inner surface of the upper panel and the lower panel, and the alignment layers 11 and 21 may be vertical alignment layers. The alignment layer 11 is positioned on the inner surface of the lower panel opposing the liquid crystal layer 3, and the alignment layer 21 is positioned on the inner surface of the upper panel opposing the liquid crystal layer 3.

The alignment layers 11 and 21 may include a portion covering most of the display area DA, and may include a portion positioned in the peripheral area PA.

The alignment layers 11 and 21 may be formed by an inkjet printing method. An aligning agent may be dripped on the lower substrate 110 or the upper substrate 210 from a nozzle of an inkjet head, and the dripped ink may be dried to form the alignment layers 11 and 21. The aligning agent may include an alignment layer material such as a polyimide (PI) and a solvent.

The dams DAM1, DAM2, DAM3, and DAM4 prevent the alignment layer from being spread into the peripheral area PA in the formation process of the alignment layers 11 and 21, the dams DAM1 and DAM3 adjacent to the display area DA firstly prevent the aligning agent from being spread into the peripheral area PA, and the dams DAM2 and DAM4 prevent the spread of the aligning agent that be flowed over the dams DAM1 and DAM3. The outermost dams DAM2 and DAM4 may define a spread margin of the aligning agent.

Among the described dams DAM1, DAM2, DAM3, and DAM4, the first dam DAM1 and the second dam DAM2 are positioned on the inner surface of the lower substrate 110, thereby being referred to as lower dams, and the third dam DAM3 and the fourth dam DAM4 are positioned on the inner surface of the upper substrate 210, thereby being referred to as upper dams. The first dam DAM1 and the third dam DAM3 may be aligned with each other in the vertical direction in a cross-sectional view, but they are not limited thereto, and they may be arranged to be alternately disposed. Likewise, the second dam DAM2 and the fourth dams DAM4 may be aligned with each other in the vertical direction in a cross-sectional view, but they are not limited thereto, and they may be arranged to be alternately disposed.

The outermost dams DAM2 and DAM4 among the dams DAM1, DAM2, DAM3, and DAM4 may overlap the sealant 310. The aligning agent spread into the peripheral area PA overlaps most of the region where the sealant 310 is formed such that the dams DAM2 and DAM4 may be positioned at the approximate center of the width of the sealant 310 or may be positioned to be close to the display area DA to prevent the sealing force of the sealant 310 from being weakened.

The vertical heights H2 and H3 or the thickness of the plurality of dams DAM1, DAM2, DAM3, and DAM4 in the cross-sectional view positioned on one substrate 110 and 210 may be the same as each other or different from each other.

The display area DA is described again.

Figure 3:
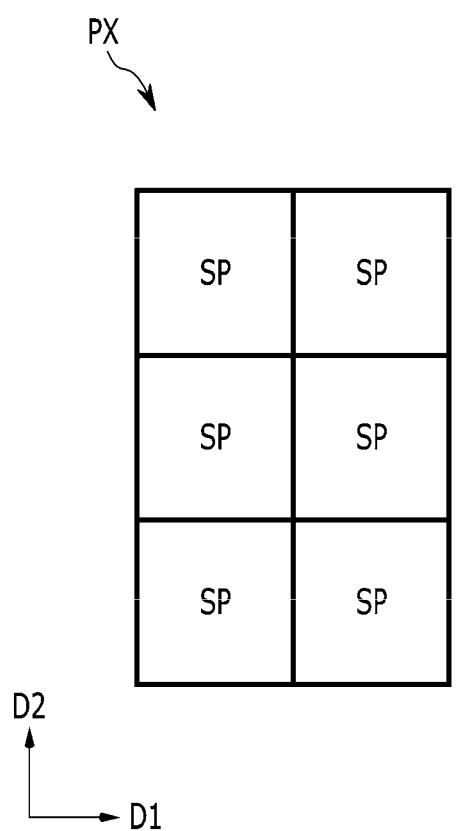
FIG. 3 and FIG. 4 are top plan views of a plurality of unit regions included in one pixel of a liquid crystal display according to an exemplary embodiment of the present disclosure.
Figure 4:
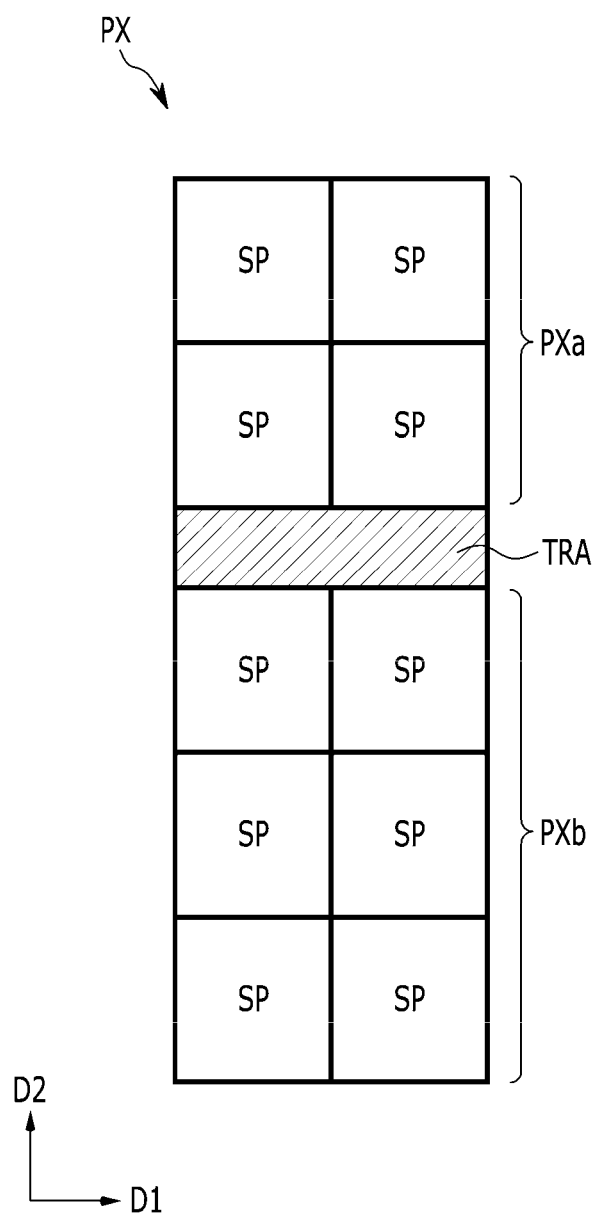

Referring to FIG. 3 and FIG. 4, one pixel PX includes at least one unit region SP. Particularly, when one pixel PX includes a plurality of unit regions SP, the areas of the unit regions SP may be the same or different.

When one pixel PX includes the plurality of unit regions SP, the unit regions SP included in one pixel PX may be disposed in a square matrix shape as shown in FIG. 3. FIG. 3 shows an example in which one pixel PX includes six unit regions SP arranged in the 3×2 matrix shape; however, an exemplary embodiment of the present disclosure is not limited thereto.

The plurality of unit regions SP included in one pixel PX, as shown in FIG. 4, may be disposed to be divided into two regions that are divided by a thin film transistor region TRA where the thin film transistor is positioned. For example, the plurality of unit regions SP arranged in a 2×2 matrix shape may be positioned above the thin film transistor region TRA, and the plurality of unit regions SP arranged in the 3×2 matrix shape may be positioned below the thin film transistor region TRA.

The thin film transistor region TRA may correspond to a light blocking region that transmits little or no light. Most of the unit region SP is the light transmission region.

One pixel PX of the liquid crystal display according to an exemplary embodiment of the present disclosure may include a plurality of subpixels PXa and PXb that may display the image of the luminance depending on gamma curves that are the same or different for one image signal. Referring to FIG. 4, the first subpixel PXa included in one pixel PX may include the plurality of unit regions SP positioned at one side of the thin film transistor region TRA, and the second subpixel PXb may include the plurality of unit regions SP positioned at the other side of the thin film transistor region TRA. When the second subpixel PXb displays the image of the lower luminance than the first subpixel PXa in the middle gray, a number of unit regions SP included in the second subpixel PXb may be greater than a number of unit regions SP included in the first subpixel PXa.

Next, the detailed structure of the unit region SP of the liquid crystal display according to an exemplary embodiment of the present disclosure is described with reference to FIG. 5 and FIG. 6 as well as the above-described drawings.

Figure 5:
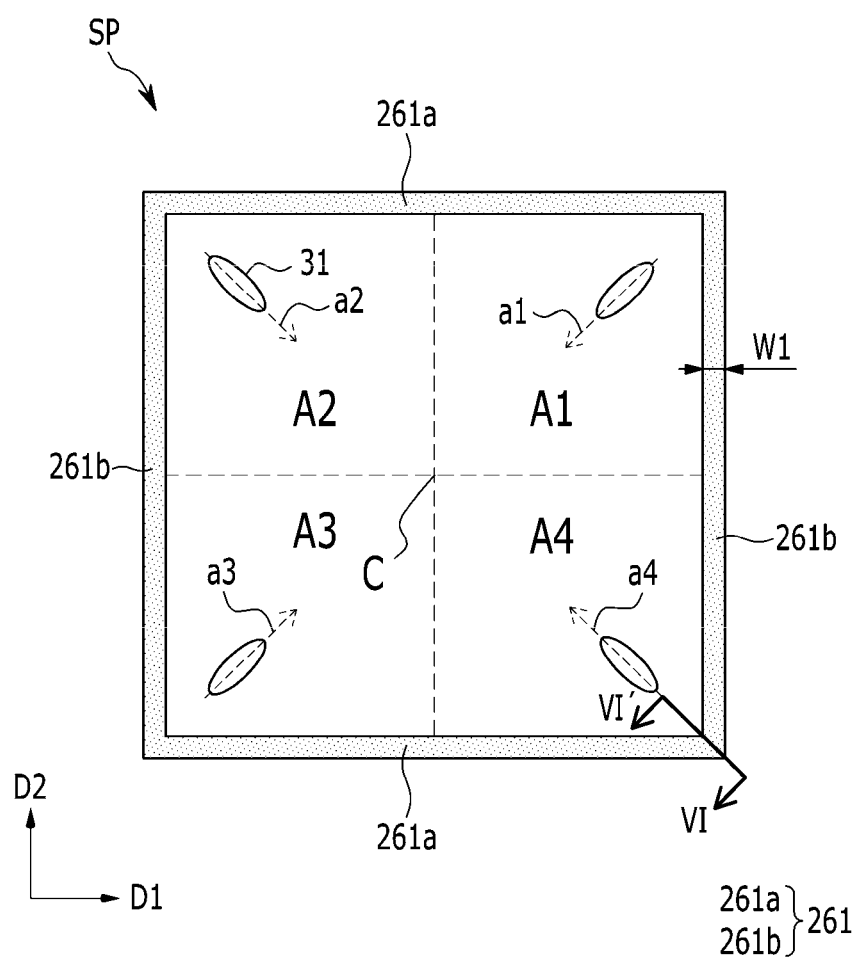
FIG. 5 is a top plan view showing a protrusion positioned in one unit region and an arrangement direction of liquid crystal molecules in a liquid crystal display according to an exemplary embodiment of the present disclosure.

Referring to FIG. 5, one unit region SP includes a plurality of sub-regions A1, A2, A3, and A4 in the plan view. The liquid crystal molecules 31 included in the different sub-regions A1, A2, A3, and A4 are arranged such that the long axes of the liquid crystal molecules 31 in each sub-region are inclined in different directions when an electric field is generated in the liquid crystal layer. The long axes of the liquid crystal molecules 31 are initially aligned in the direction perpendicular to the surface of the display panel 300, and then the liquid crystal molecules 31 are rearranged to be inclined in the direction parallel to the surface of the display panel 300 when the electric field is generated in the liquid crystal layer 3.

For example, as shown in FIG. 5, when a unit region SP includes four sub-regions A1, A2, A3, and A4, the liquid crystal molecules 31 positioned in the different sub-regions A1, A2, A3, and A4 are inclined in the different directions a1, a2, a3, and a4. The directions a1, a2, a3, and a4 in which the liquid crystal molecules 31 are mainly inclined are different from the first direction D1 and the second direction D2. For example, the inclination directions a1, a2, a3, and a4 of the liquid crystal molecules 31 in the sub-regions A1, A2, A3, and A4 may form an angle of about 40 degrees to about 50 degree or about 130 degrees to about 140 degrees with respect to the first direction D1 or the second direction D2; however the present disclosure is not limited thereto. The main inclination direction a1 of the liquid crystal molecules 31 in the first sub-region A1 is opposite to the main inclination direction A3 of the liquid crystal molecules 31 in the third sub-region A3, and the main inclination direction a2 of the liquid crystal molecules 31 in the second sub-region A2 is opposite to the main inclination direction a4 of the liquid crystal molecules 31 in the fourth sub-region A4. The vector components of the first direction D1 or the second direction D2 of the inclination directions a1, a2, a3, and a4 of the liquid crystal molecules 31 of two sub-regions of A1, A2, A3, and A4 adjacent each other in the first direction D1 or the second direction D2 may be opposite to each other.

Most parts of the sub-regions A1, A2, A3, and A4 form the light transmission region in which the light is transmitted.

Figure 6:
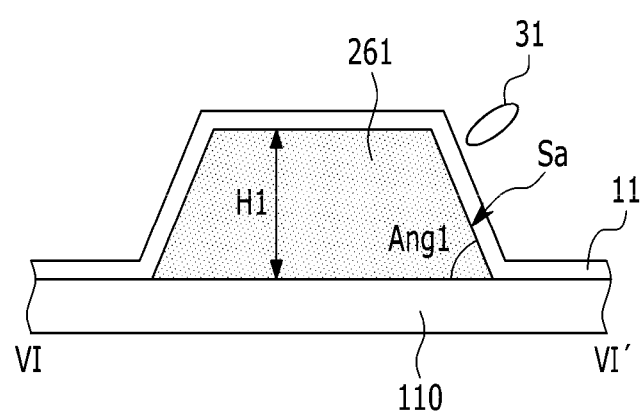
FIG. 6 is a partial cross-sectional view of the liquid crystal display shown in FIG. 5 taken along a line VI-VI'.

Referring to FIG. 5 and FIG. 6, one unit region SP includes a protrusion 261 to control the arrangement direction of the liquid crystal molecules 31. The protrusion 261 may be included in the lower panel, in which case, the protrusion 261 is positioned between the lower substrate 110 and the liquid crystal layer. The alignment layer 11 is positioned on the protrusion 261.

The protrusion 261, as shown in FIG. 6, is protruded toward the liquid crystal layer in the cross-sectional view to provide a pretilt to the liquid crystal molecules 31, thereby controlling the inclination direction of the liquid crystal molecules 31. The position of the protrusion 261 in the cross-sectional view is not limited thereto, and the protrusion 261 may be positioned in other layers of which the surface adjacent to the liquid crystal layer may be protruded toward the liquid crystal layer.

Referring to FIG. 5, the protrusion 261 is formed along at least a portion around one unit region SP in the plan view.

In detail, the protrusion 261 includes, in the plan view, a pair of transverse portions 261a opposing each other with respect to the center C of the unit region SP and respectively including a side parallel to the first direction D1, and a pair of longitudinal portions 261b opposing each other with respect to the center C of the unit region SP and respectively including a side parallel to the second direction D2.

The transverse portions 261a and the longitudinal portions 261b adjacent to each other may be connected to each other, as shown in FIG. 5, or may be separated from each other by a predetermined distance. A width W1 of the transverse portions 261a or the longitudinal portions 261b may be constant or not.

The protrusion 261 including a pair of transverse portions 261a and a pair of longitudinal portions 261b are connected to each other to form a closed line, and in this case, the shape of the protrusion 261 may be an approximate quadrangle.

The protrusion 261 is formed along at least a portion around the light transmission region of the unit region SP. FIG. 5 shows an example in which the protrusion 261 is formed of the closed line enclosing the entire periphery of the plurality of sub-regions A1, A2, A3, and A4 included in the unit region SP. The protrusion 261 may correspond to the light blocking region enclosing the light transmission region, but is not limited thereto.

Referring to FIG. 6, the protrusion 261 includes a lateral surface Sa as an inclination surface that is obliquely inclined with respect to an extension direction of the surface of the lower substrate 110 in the cross-sectional view. The lateral surface Sa of the protrusion 261 forms a cross-sectional angle Ang1 of about 40 degrees to about 50 degrees with the lower surface of the protrusion 261 or the surface of the lower substrate 110; however, it is not limited thereto, and it may be changed depending on a material characteristic of the protrusion 261 or a manufacturing process.

Referring to FIG. 6, the protrusion 261 includes a pair of lateral surfaces Sa opposing each other, and the upper surface positioned therebetween may be almost parallel to the lower surface of the protrusion 261. However, the upper surface substantially parallel to the lower surface of the protrusion 261 may be omitted.

A height H1 from the lower surface of the protrusion 261 to the highest upper surface, that is, the top thickness in the cross-sectional view, may be about 0.5 um to about 1.2 um; however, it is not limited thereto, and may be changed depending on a design condition.

Since an alignment layer 11 as a vertical alignment layer is positioned on the surface of the protrusion 261, the liquid crystal molecules 31 around the surface of the protrusion 261 may be aligned in a direction almost perpendicular to the surface of the protrusion 261. This alignment of the liquid crystal molecules 31 may be maintained after the electric field is generated in the liquid crystal layer 3 even when the electric field is no longer generated in the liquid crystal layer 3.

When the state in which the liquid crystal molecules 31 are arranged in the direction almost perpendicular to the surface of the display panel 300 is referred to as a reference to alignment, the protrusion 261 controls the liquid crystal molecules 31 of the peripherally thereof, and particularly, adjacent to the lateral surface Sa, to have the pretilt in the direction toward the inside of the sub-regions A1, A2, A3, and A4 in the plan view even when the electric field is no longer generated in the liquid crystal layer. The pretilt direction is a direction forming an acute angle with a normal direction (referred to as a reference alignment direction) almost perpendicular to the surface of the lower substrate 110, and the pretilt angle thereof may be about 30 degrees or more.

The pretilt of the liquid crystal molecules 31 due to the protrusion 261 allows the liquid crystal molecules 31 positioned in the sub-regions A1, A2, A3, and A4 with the inclination directions a1, a2, a3, and a4 to be quickly arranged when the electric field is generated in the liquid crystal layer.

In a traditional display panel, if the liquid crystal layer of the display panel 300 is pushed by an external pressure such that the arrangement of the liquid crystal molecules 31 is scattered and the external pressure is removed, the liquid crystal molecules 31 are not restored and stains may appear. However, according to an exemplary embodiment of the present disclosure, since the protrusion 261 controls the alignment of the liquid crystal molecules 31 adjacent thereto in the constant direction, the protrusion 261 helps the liquid crystal molecules 31 of the sub-regions A1, A2, A3, and A4 to be restored in the original arrangement direction and increases the restoring speed after the pressure is removed after the arrangement of the liquid crystal molecules 31 is scattered by the external pressure.

As described above, according to an exemplary embodiment of the present disclosure, when the electric field is formed in the liquid crystal layer to display the image, the liquid crystal molecules 31 may be more quickly arranged in the targeted arrangement direction by the protrusion such that the transmittance may be further increased, and the image further closer to the targeted luminance may be displayed, thereby improving the display quality.

According to an exemplary embodiment of the present disclosure, the lower dams DAM1 and DAM2 positioned on the inner surface of the substrate 110 and the protrusion 261 are positioned at the same layer, include the same material, and are formed by the same process. The dams DAM1 and DAM2 and the protrusion 261 may include an organic material. According to an exemplary embodiment of the present disclosure, in the manufacturing process of the liquid crystal display, the dams DAM1 and DAM2 and the protrusion 261 may be formed by a photolithography process in exposure and development using one photomask after the organic material is coated on the lower substrate 110.

As described above, the dams DAM1 and DAM2 and the protrusion 261 that have the different functions and are formed on the different positions are formed by using one photomask such that the manufacturing cost and the manufacturing time may be reduced, and the manufacturing process may be simplified.

Next, one example of the detailed structure of the unit region SP of the liquid crystal display according to an exemplary embodiment of the present disclosure is described with reference to FIG. 7 as well as the above-described drawings. The same constituent elements as the exemplary embodiment described above designate the same reference numerals, a duplicated description is omitted, and differences are mainly described.

Figure 7:
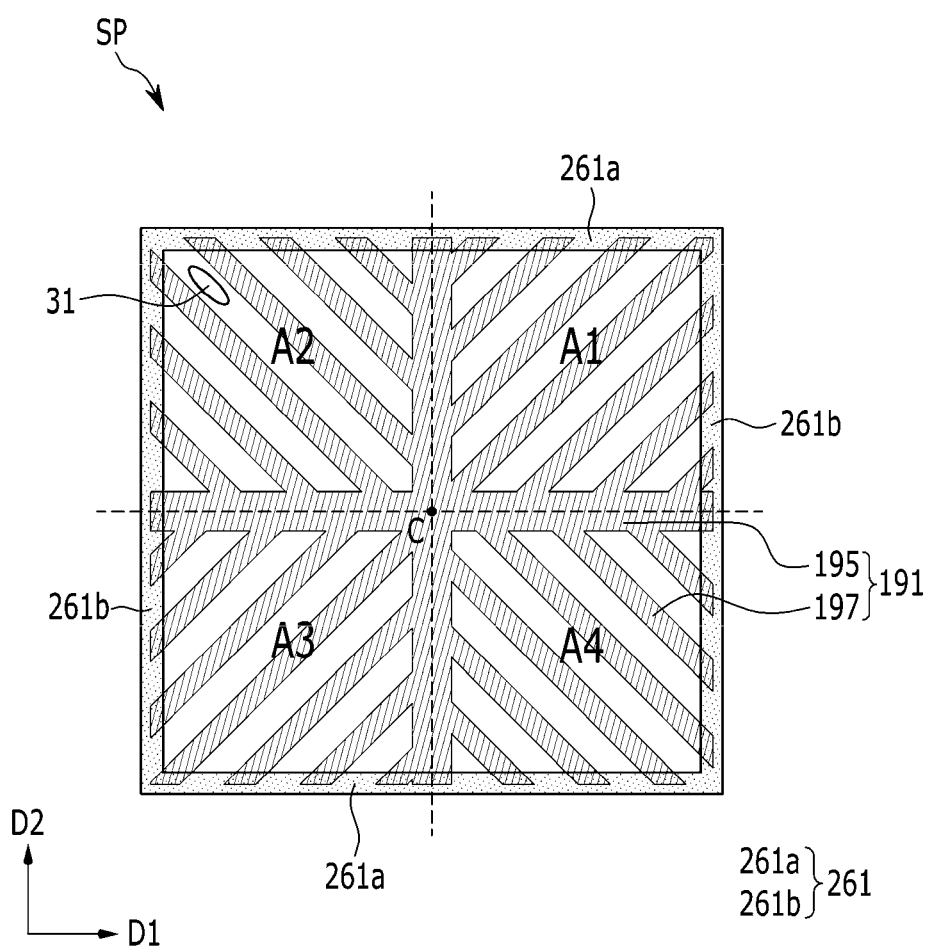
FIG. 7 is a top plan view showing a structure of a protrusion positioned in one unit region and a unit electrode portion in a liquid crystal display according to an exemplary embodiment of the present disclosure.

Referring to FIG. 7, the liquid crystal display according to the present exemplary embodiment is the same as most of the above-described exemplary embodiment; however, the structure of the pixel electrode is more concrete.

A unit electrode portion 191 is positioned in one unit region SP. When one pixel PX includes the plurality of unit regions SP, the unit electrode portion 191 is a portion of the pixel electrode positioned in the pixel PX, and when one pixel PX includes one unit region SP, the unit electrode portion 191 may be the pixel electrode positioned in the pixel PX.

The unit electrode portion 191 has an overall quadrangle shape and includes a cross-shaped stem portion 195, which includes a transverse stem portion and a longitudinal stem portion crossing the transverse stem portion, and a plurality of branch portions 197. A center of the cross-shaped stem portion 195 may approximately coincide with the center C of the unit region SP.

The cross-shaped stem portion 195 extends along the boundary between four sub-regions A1, A2, A3, and A4 of the unit region SP. In other words, the unit region SP is divided into four sub-regions A1, A2, A3, and A4 by the cross-shaped stem portion 195. The transverse stem portion of the cross-shaped stem portion 195 may extend parallel to the first direction D1, and the longitudinal stem portion may extend parallel to the second direction D2.

The plurality of branch portions 197 are connected to the cross-shaped stem portion 195 and extend outwards from the cross-shaped stem portion 195. Most of the branch portion 197 is positioned inside the sub-regions A1, A2, A3, and A4, and a slit in which the electrode is removed is formed between the adjacent branch portions 197 positioned in each of the sub-regions A1, A2, A3, and A4. The positions where the branch portion 197 positioned in two of sub-regions A1, A2, A3, and A4 adjacent in the first direction D1 or the second direction D2 meet the cross-shaped stem portion 195 are not the same but may be alternately disposed.

Although not shown, at least portions of the ends of the branch portions 197 are connected to each other, thereby forming an outer border of the unit electrode portion 191.

The acute angle between the branch portion 197 and the extension direction of the transverse stem portion of the cross-shaped stem portion 195 may be about 40 degrees to about 50 degrees; however it is not limited thereto, and it may be approximately controlled by considering the display characteristic such as the visibility of the display device.

According to an exemplary embodiment of the present disclosure, the unit region SP includes the protrusion 261 as described above, and the protrusion 261 may be positioned on or under the unit electrode portion 191. Hereafter, an example in which the protrusion 261 is positioned on the unit electrode portion 191 is described.

The side of the end of the branch portion 197 may or may not overlap the protrusion 261. FIG. 7 shows an example in which the side of the end of the branch portion 197 overlaps the protrusion 261. In this case, the efficiency of the light transmission region of the unit region SP is further increased.

Although not shown, the display panel 300 further includes an opposed electrode disposed opposite to the unit electrode portion 191 with the liquid crystal layer in between. The opposed electrode is the field generating electrode generating the electric field in the liquid crystal layer along the pixel electrode. A difference between the data voltage applied to the pixel electrode and the voltage applied to the opposed electrode may be changed depending on the gray of the image signal corresponding to the pixel PX. The opposed electrodes positioned in the plurality of pixels PX of the display panel 300 are connected to be transmitted with the same voltage. The opposed electrode may be formed of one plate without any cutout. The opposed electrode may be positioned on the inner surface of the above-described upper substrate 210.

Next, a display operation of the liquid crystal display according to an exemplary embodiment of the present disclosure is described.

If the thin film transistor connected to the pixel electrode including the unit electrode portion 191 is turned on, the data voltage is applied to the pixel electrode. The opposed electrode applied with the predetermined voltage, such as the common voltage, forms the electric field in the liquid crystal layer 3 along the pixel electrode. The electric field includes a vertical component in the direction almost perpendicular to the surface of the display panel 300, and the liquid crystal molecules 31 are inclined in the direction almost parallel to the surface of the display panel 300 due to the vertical component of the electric field. In this case, the edge of the branch portion 197 of the unit electrode portion 191 generates a fringe field. The liquid crystal molecules 31 near the branch portions 197 are inclined toward the inside of the branch portions 197 by the fringe field. Resultantly, the liquid crystal molecules 31 are inclined approximately toward the center C and in the direction approximately parallel to the extension direction of the branch portions 197. Accordingly, the inclination directions of the liquid crystal molecules 31 are different from each other in four sub-regions A1, A2, A3, and A4, and may be the same as the inclination directions a1, a2, a3, and a4 of the liquid crystal molecules 31 shown in FIG. 5 described above.

As described above, the protrusion 261 provides the pretilt to the liquid crystal molecules 31 near it, increasing the control force (referred to as a liquid crystal alignment control force) rearranging the liquid crystal molecules 31 and the response speed. The rest of the effects by the protrusion 261 are the same as described earlier.

According to an exemplary embodiment of the present disclosure, the control force of the liquid crystal molecules 31 may be sufficiently obtained even if alignment aids are not included in the alignment layer or the liquid crystal layer. Accordingly, without addition of the complicated manufacturing process to form the alignment aids, the display device having the liquid crystal alignment control force and the transmittance may be provided.

Next, various examples of the detailed structure of the unit region SP of the liquid crystal display according to an exemplary embodiment of the present disclosure is described with reference to FIG. 8 to FIG. 14 as well as the above-described drawings.

Figure 8:
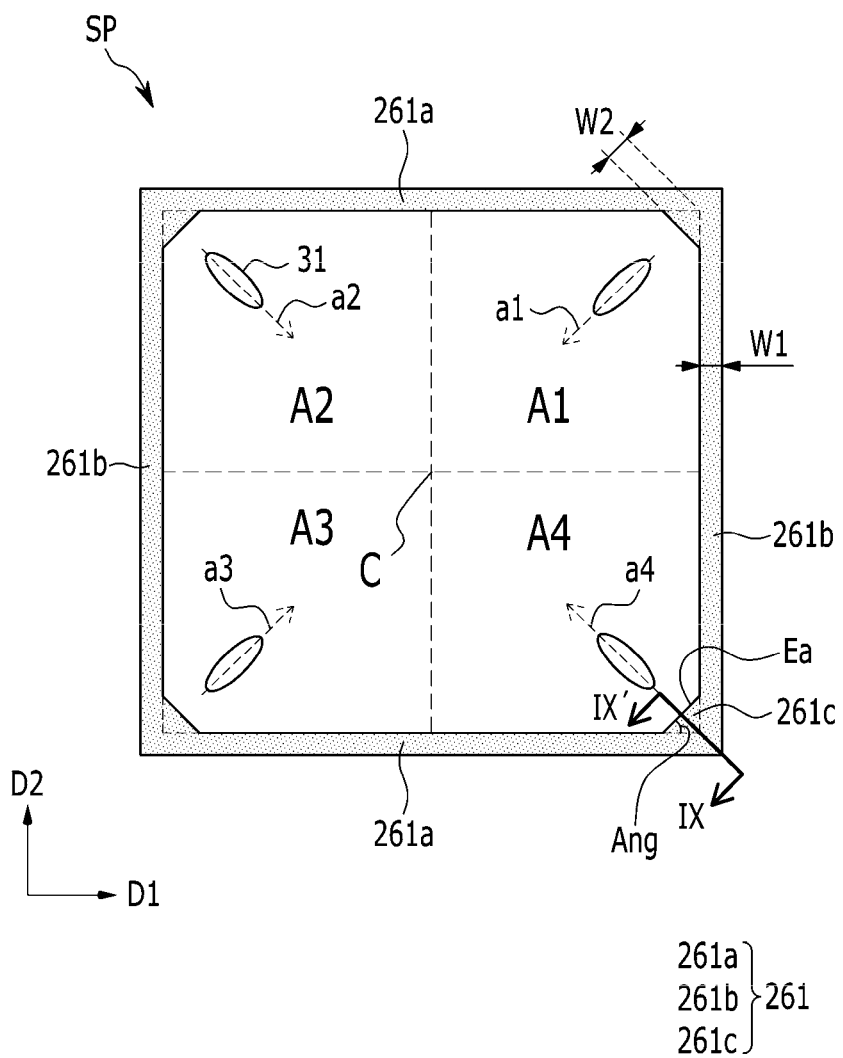
FIG. 8 is a top plan view of a protrusion positioned at one unit region and an arrangement direction of liquid crystal molecules in a liquid crystal display according to an exemplary embodiment of the present disclosure.
Figure 9:
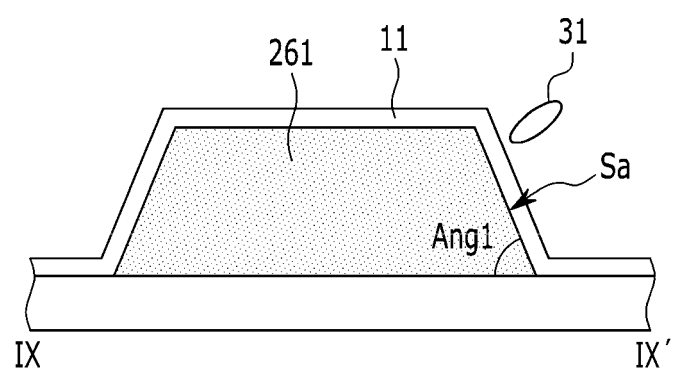
FIG. 9 is a partial cross-sectional view of the liquid crystal display shown in FIG. 8 taken along a line IX-IX'.

First, referring to FIG. 8 and FIG. 9, the liquid crystal display according to the present exemplary embodiment is the same as most of the exemplary embodiment shown in FIG. 5 and FIG. 6 except for the shape of the protrusion 261.

The protrusion 261 further includes a corner portion 261c having an oblique side Ea parallel to the direction oblique with respect to the first direction D1 and the second direction D2. The corner portion 261c is positioned between the transverse portion 261a and the longitudinal portion 261b adjacent to each other. The corner portion 261c may be approximately triangular including the oblique side Ea. Among the sides of the corner portion 261c, two sides except for the oblique side Ea may be respectively parallel to the first direction D1 and the second direction D2. The oblique side Ea of the corner portion 261c may be connected to the side of the transverse portion 261a and the side of the longitudinal portion 261b adjacent thereto as shown, or may be separated by a predetermined distance.

A pair of transverse portion 261a and a pair of longitudinal portion 261b of the protrusion 261 and four corner portions 261c may be connected to each other, thereby forming the closed line.

The oblique side Ea of the corner portion 261c may form the angle Ang of more than about 40 degrees to less than 90 degrees with the first direction D1. Here, the angle Ang may be acute. The extension direction of the oblique side Ea may cross the inclination directions a1, a2, a3, and a4 of the liquid crystal molecules 31 in the sub-regions A1, A2, A3, and A4, and in detail, two directions may be about perpendicular to each other.

A distance W2 between the oblique side Ea of the corner portion 261c and the vertex opposing thereto may be equal to or less than the width W1 of the transverse portion 261a or the longitudinal portion 261b but is not limited thereto.

Referring to FIG. 8 and FIG. 9, the oblique side Ea of the corner portion 261c corresponds to a bottom surface of the lateral surface Sa of the corner portion 261c in the cross-sectional view. The cross-sectional angle Ang1 of the lateral surface Sa of the protrusion 261 with the lower surface of the protrusion 261 or the surface of the lower substrate 110 may be about 40 degrees to about 50 degrees; however, it is not limited thereto, and it may be changed depending on the material characteristic of the protrusion 261 or the manufacturing process.

The corner portion 261c of the protrusion 261 controls the liquid crystal molecules 31 adjacent thereto to previously have a pretilt in the inclination directions a1, a2, a3, and a4. That is, for the corner portion 261c, since the direction perpendicular to the oblique side Ea is toward the center C of the unit region SP in the plan view, the liquid crystal molecules 31 near the corner portion 261c are previously pretilted in the inclination directions a1, a2, a3, and a4 when the electric field is generated in the liquid crystal layer such that they are more quickly arranged in the inclination directions a1, a2, a3, and a4 on the rearrangement, thereby increasing the response speed of the liquid crystal display and increasing the transmittance.

In FIG. 8, the angle Ang is about 45 degrees, and the corner portion 261c may control the liquid crystal molecules 31 positioned in the sub-regions A1, A2, A3, and A4 to be more quickly arranged in the direction toward the center C.

In a traditional display panel, if the liquid crystal layer of the display panel 300 is pushed by the external pressure such that the arrangement of the liquid crystal molecules 31 is scattered, the liquid crystal molecules 31 are not restored and are recognized as the stain even after the external pressure is removed. However, according to an exemplary embodiment of the present disclosure, the corner portion 261c of the protrusion 261 controls the liquid crystal molecules 31 to be more quickly restored in the inclination directions a1, a2, a3, and a4.

When the angle Ang is larger than about 45 degrees, the inclination directions a1, a2, a3, and a4 of the liquid crystal molecules 31 may be controlled by the corner portion 261c to be less than about 45 degrees with the first direction D1. In this case, when the electric field is generated in the liquid crystal layer, the liquid crystal molecules 31 may be inclined in the direction closer to the first direction D1 than the second direction D2 such that the lateral visibility may be further improved.

Figure 10:
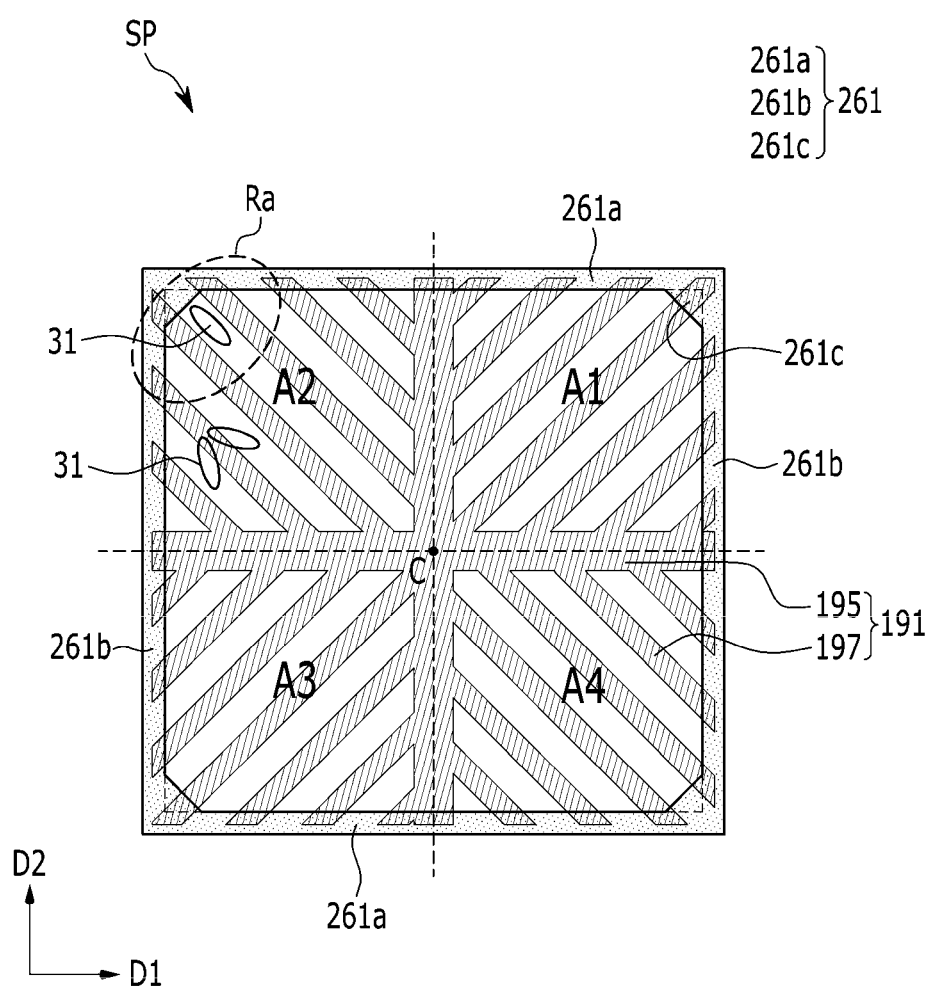
FIGS. 10, 11 and 12 are top plan views showing a structure of a protrusion positioned at one unit region and a unit electrode portion in a liquid crystal display according to an exemplary embodiment of the present disclosure, respectively.

Next, referring to FIG. 10, the liquid crystal display according to the present exemplary embodiment is the same as most of the exemplary embodiment shown in FIG. 7; however, the shape of the protrusion 261 may be the same as the protrusion 261 of the exemplary embodiment shown in FIG. 8 and FIG. 9. As described above, the protrusion 261 provides the pretilt to the liquid crystal molecules 31 thereround, thereby increasing the liquid crystal alignment control force rearranging the liquid crystal molecules 31 and the response speed. Particularly, like the region Ra shown in FIG. 10, the corner portion 261c of the protrusion 261 provides the pretilt close to the direction in which the liquid crystal molecules 31 are inclined to the liquid crystal molecules 31 such that the liquid crystal alignment control force may be further increased and the response speed of the liquid crystal molecules 31 may be increased.

Figure 11:
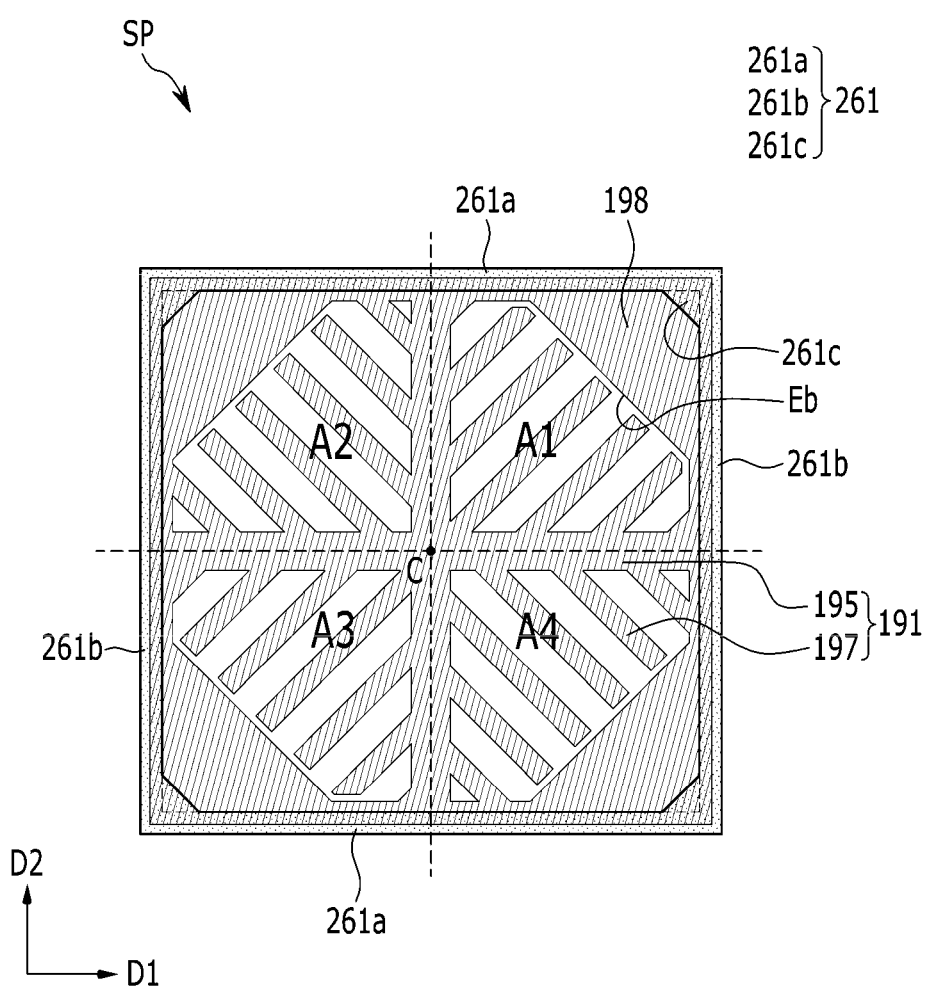

Next, referring to FIG. 11, the liquid crystal display according to the present exemplary embodiment is the same as most of the above-described exemplary embodiment; however, the structure of the unit electrode portion 191 may be different.

The unit electrode portion 191 may include a planar portion 198 of at least one whole plate positioned at at least one of four corners. When the unit electrode portion 191 is approximately quadrangle, at least one planar portion 198 is respectively positioned at at least one of the quadrangle corners. FIG. 11 shows an example in which the planar portion 198 is respectively positioned on four corners of the unit electrode portion 191.

The electrode forming the planar portion 198 is not patterned, thereby having the continuous surface without the opening such as the slit.

One planar portion 198 may be a polygon including the oblique side Eb positioned in one of the sub-regions A1, A2, A3, and A4, for example, a triangle. The planar portion 198 may be the triangle including one vertex opposing the oblique side Eb while corresponding to the vertex of the unit electrode portion 191, one vertex positioned on the transverse side of the unit electrode portion 191, and one vertex positioned on the longitudinal side of the unit electrode portion 191. The oblique side Eb extends in the direction crossing the extension direction of the branch portion 197 in each of the sub-regions A1, A2, A3, and A4, and in detail, may be approximately perpendicular to the extension direction of the branch portion 197. The planar portion 198 may include two sides forming the outer part of the unit electrode portion 191 and connected to the oblique side Eb.

Among the vertices of the planar portion 198, the vertices positioned on the transverse side and the longitudinal side of the unit electrode portion 191 and the vertex positioned at the end of the oblique side Eb may be positioned between the vertex of the unit electrode portion 191 and the end of the longitudinal stem portion of the cross-shaped stem portion 195. Accordingly, the planar portion 198 may occupy an area of less than about 50% in each of the sub-regions A1, A2, A3, and A4. In this case, the distance between the oblique side Eb of the planar portion 198 and the vertex opposing thereto may be less about 50% of the diagonal length of each of the sub-regions A1, A2, A3, and A4.

The oblique side Eb of the planar portion 198 forms the angle of about 40 degrees to about 50 degrees with the extension direction of the transverse stem portion of the cross-shaped stem portion 195, that is, the first direction D1. Particularly, the oblique side Eb of the planar portion 198 may be almost parallel to the oblique side Ea of the corner portion 261c of the protrusion 261. The oblique side Ea of the corner portion 261c of the protrusion 261 overlaps the inner region of the planar portion 198.

As described above, if the unit electrode portion 191 includes the planar portion 198, the liquid crystal control force arises from the fringe field generated by the oblique side Eb of the planar portion 198 such that the transmittance of the display device may be further increased.

Referring to FIG. 10, the liquid crystal molecules 31 near the edge of the branch portion 197 are not arranged parallel to the extension direction of the branch portion 197, but tend to be arranged further toward the inside branch portion 197. Accordingly, the transmittance is partially decreased on the edge of the branch portion 197 such that a dark portion may be recognized. In contrast, in the embodiment of FIG. 11, because the unit electrode portion 191 includes the planar portion 198, the dark portion near the branch portion 197 is decreased such that the entire transmittance of the unit region SP may be increased.

In more detail, because the slit (not shown) or the branch portion 197 is not formed in the planar portion 198 of FIG. 11, the control force may not be sufficient on the rearrangement of the liquid crystal molecules 31. However, because the planar portion 198 is positioned at the position near the corner portion 261c of the protrusion 261, the liquid crystal control force is reinforced by the corner portion 261c such that the arrangement direction of the liquid crystal molecules 31 corresponding to the planar portion 198 may be effectively controlled. Accordingly, the sufficient transmittance may be obtained.

The planar portion 198 is electrically connected to the cross-shaped stem portion 195 through a separate connection (not shown). Referring to FIG. 11, the planar portion 198 is separated from the end of the adjacent branch portion 197 by a predetermined distance. However, the present disclosure is not limited thereto, and the planar portion 198 and the adjacent branch portion 197 may be connected to each other.

Figure 12:
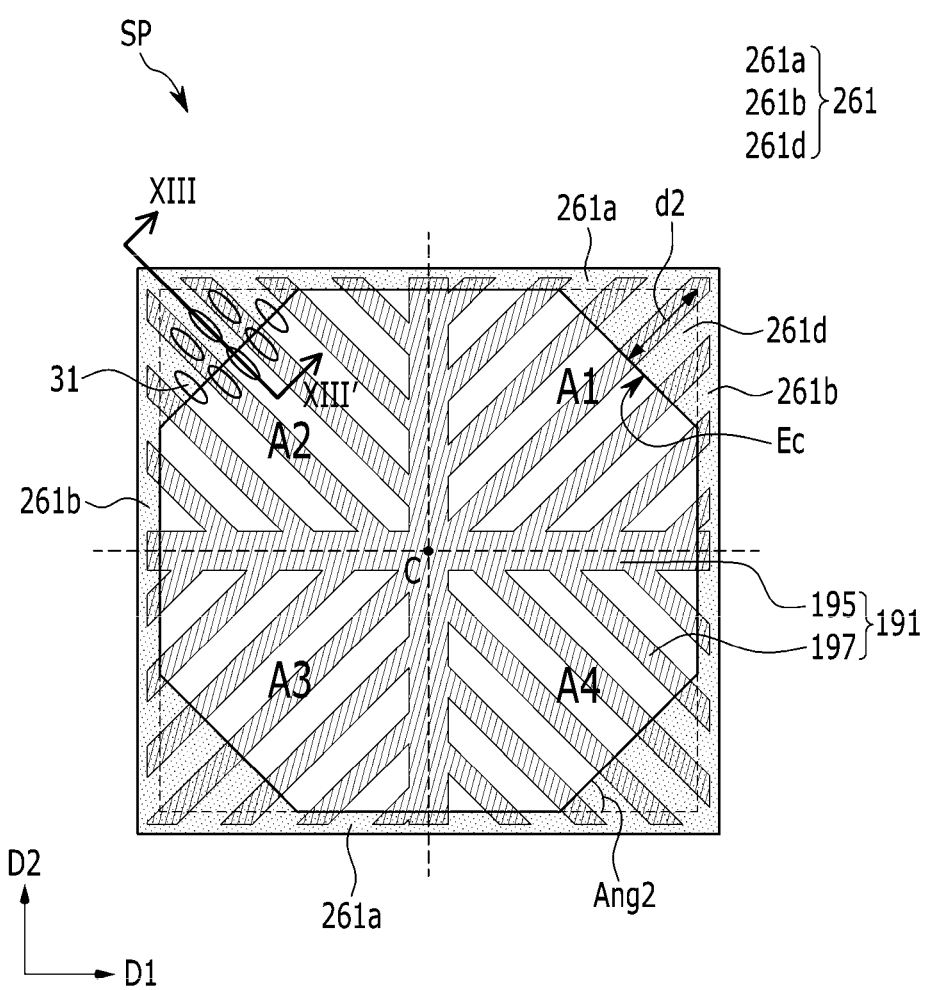
Figure 13:
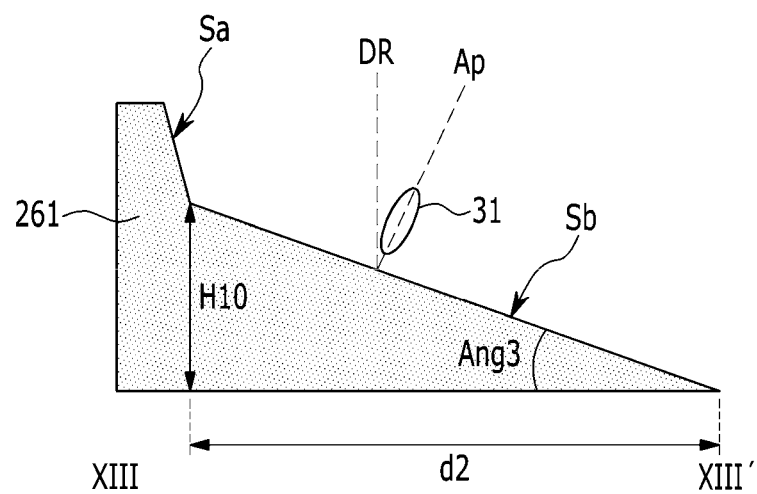
FIG. 13 is a cross-sectional view of the display device shown in FIG. 12 taken along a line XIII-XIII'.
Figure 14:
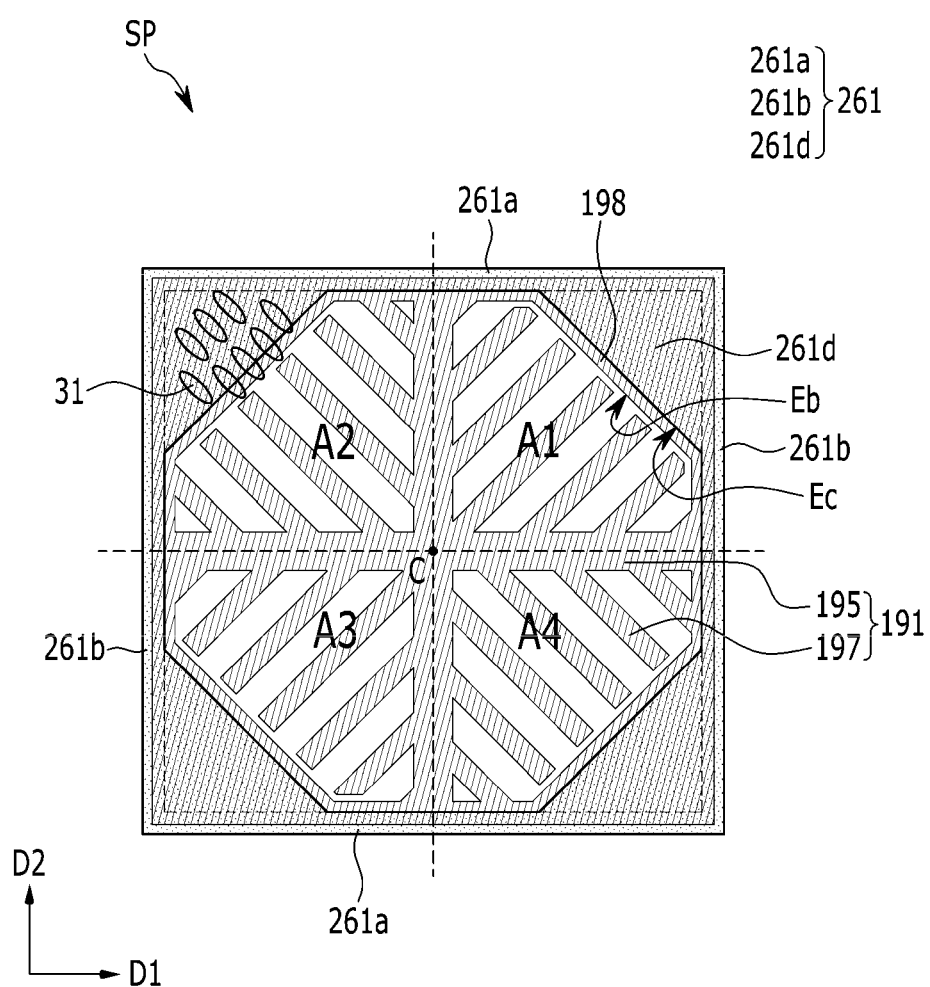
FIG. 14 is a top plan view showing a structure of a protrusion positioned at one unit region and a unit electrode portion in a liquid crystal display according to an exemplary embodiment of the present disclosure.

Next, referring to FIG. 12 and FIG. 13, the liquid crystal display according to the present exemplary embodiment is the same as the exemplary embodiment shown in FIG. 10 except for the structure of the protrusion 261. The protrusion 261 according to the present exemplary embodiment includes an inclined corner portion 261d instead of the above-described corner portion 261c.

The inclined corner portion 261d may be approximately triangular including the oblique side Ec parallel to the direction oblique with respect to the first direction D1 and the second direction D2. Among the sides of the inclined corner portion 261d, two sides except for the oblique side Ec may be approximately parallel to the first direction D1 or the second direction D2. The oblique side Ec of the inclined corner portion 261d, as shown in FIG. 12, may be connected to the side of the transverse portion 261a and the side of the longitudinal portion 261b; however, they may be separated by the predetermined distance. The inclined corner portion 261d is respectively positioned at at least one corner of the unit region SP and is positioned between the transverse portion 261a and the longitudinal portion 261b adjacent to each other.

A pair of transverse portions 261a, a pair of longitudinal portions 261b, and four inclined corner portions 261d may be connected to each other, thereby forming the approximate closed line. In this case, the outer shape of the protrusion 261 may be about quadrangular.

The oblique side Ec of the inclined corner portion 261d may form the angle Ang2 of more than about 40 degree to less than 90 degrees with the first direction D1 in the plan view. Here, the angle Ang2 may be acute. The extension direction of the oblique side Ec crosses the inclination directions a1, a2, a3, and a4 of the liquid crystal molecules 31 in each of the sub-regions A1, A2, A3, and A4, and in detail, two directions may be approximate perpendicular.

The distance d2 between the oblique side Ec of the inclined corner portion 261d and the vertex opposing thereto may be less than about 50% of the length of the diagonal direction of each of the sub-regions A1, A2, A3, and A4.

The transverse portion 261a and the longitudinal portion 261b of the protrusion 261 may correspond to the light blocking region enclosing the light transmission region, and most of the inclined corner portion 261d may correspond to the light transmission region. That is, the light is transmitted in the region where the inclined corner portion 261d is positioned, thereby displaying the image.

Referring to FIG. 12 and FIG. 13, the transverse portion 261a and the longitudinal portion 261b of the protrusion 261 include a lateral surface Sa as the inclination surface that is obliquely inclined with respect to the lower surface of the protrusion 261 in the cross-sectional view, and the inclined corner portion 261d of the protrusion 261 includes a lateral surface Sb as the inclination surface that is obliquely inclined with respect to the lower surface of the protrusion 261. The slope of the lower surface of the lateral surface Sa and the slope of the lower surface of the lateral surface Sb may be different, and the inclination of the lateral surface Sb may be smoother than the inclination of the lateral surface Sa.

A cross-section angle Ang3 of the lateral surface Sb of the inclined corner portion 261d with the lower surface of the protrusion 261 may be about 1 degree to about 2 degrees; however, it is not limited thereto, and it may be changed depending on the material characteristic of the protrusion 261 or the manufacturing process.

A height H10 from the lower surface of the inclined corner portion 261d to the highest upper surface, that is, the highest thickness, may be less than about 0.5 um; however, it is not limited thereto, and it may be changed depending on the design conditions. Particularly, since the inclined corner portion 261d corresponds to the light transmission region of each sub-region A1, A2, A3, and A4 of the unit region SP, to obtain more than the predetermined transmittance, it may be beneficial to limit the thickness of the inclined corner portion 261d.

The outer part of the inclined corner portion 261d is connected to the transverse portion 261a or the longitudinal portion 261b of the protrusion 261. The highest height H10 of the inclined corner portion 261d may be smaller than the thickness of the transverse portion 261a or the longitudinal portion 261b of the protrusion 261.

The oblique side Ec of the inclined corner portion 261d of the protrusion 261 in the plan view corresponds to the bottom side of the lateral surface Sb of the inclined corner portion 261d in the cross-sectional view.

A state in which the liquid crystal molecules 31 are arranged in the direction approximate perpendicular to the surface of the display panel 300 is referred to as a reference alignment, and the inclined corner portion 261d controls the liquid crystal molecules 31 adjacent to the lateral surface Sb thereof to have the pretilt in the direction toward the inside of each sub-region A1, A2, A3, and A4 even when the electric field is not generated in the liquid crystal layer. The pretilt direction of the liquid crystal molecules 31 is the direction forming the acute angle with the reference alignment direction DR approximate perpendicular to the surface of the lower substrate 110, and a pretilt angel Ap thereof may be about 1 degree to about 2 degrees, for example.

The pretilt of the liquid crystal molecules 31 by the protrusion 261 allows the liquid crystal molecules 31 positioned in the sub-regions A1, A2, A3, and A4 to be quickly arranged in the inclination directions a1, a2, a3, and a4 when the electric field is generated in the liquid crystal layer.

Particularly, for the inclined corner portion 261d, since the direction perpendicular to the oblique side Ec thereof is almost toward the center C of the unit region SP, the liquid crystal molecules 31 near the inclined corner portion 261d are previously pretilted in the inclination directions a1, a2, a3, and a4 when the electric field is generated in the liquid crystal layer such that the rearrangement speed is faster, thereby increasing the response speed and the transmittance of the display device. Next, referring to FIG. 14, the liquid crystal display according to the present exemplary embodiment is the same as most of the exemplary embodiment shown in FIG. 12 and FIG. 13; however, the structure of the unit electrode portion 191 may be the same as the unit electrode portion of the exemplary embodiment shown in FIG. 11. The description thereof was previously given, and as such, a detailed description thereof is omitted hereafter.

The oblique side Ec of the inclined corner portion 261d may overlap the inside of the planar portion 198. The oblique side Ec of the inclined corner portion 261d and the oblique side Eb of the planar portion 198 may be approximately parallel to each other.

In the manufacturing process of the liquid crystal display according to an exemplary embodiment of the present disclosure, the protrusion 261 and the dams DAM1 and DAM2 may be formed through the exposure using the photomask and the photolithography process using the developing after coating the organic material on the lower substrate 110. In this case, the light transmittance of the photomask corresponding to the transverse portion 261a and the longitudinal portion 261b of the protrusion 261 may be constant, and the light transmittance of the photomask corresponding to the inclined corner portion 261d may be different from the light transmittance of the photomask corresponding to the transverse portion 261a and the longitudinal portion 261b. If the organic material has negative photosensitivity such that a portion irradiated by light is maintained, the light transmittance of the photomask corresponding to the inclined corner portion 261d is lower than the light transmittance of the photomask corresponding to the transverse portion 261a and the longitudinal portion 261b, and the light may be less irradiated to the organic material layer in the exposure process.

To form the inclined corner portion 261d to have the lateral surface Sb having the smooth inclination, the photomask region corresponding to the inclined corner portion 261d may have different light transmittance depending on the position. If the material of the protrusion 261 has the negative photosensitivity such that the portion irradiated by the light is maintained, the light transmittance of the photomask corresponding to the inclined corner portion 261d may be decreased toward the oblique side Ec from the vertex opposing the oblique side Ec of the inclined corner portion 261d. The light transmittance change of the photomask corresponding to the inclined corner portion 261d may be step-by-step like a step shape or may be gradual.

Next, the liquid crystal display according to an exemplary embodiment of the present disclosure is described with reference to FIG. 15 to FIG. 17B as well as the above-described drawings.

The liquid crystal display according to the exemplary embodiment of the present disclosure may include lower and upper panels 100 and 200 opposing each other, and a liquid crystal layer 3 positioned between the two panels 100 and 200 in the cross-sectional structure.

The lower panel 100 is described first. A gate conductor including a plurality of gate lines 121 and a plurality of reference voltage lines 131 is disposed on an inner surface of the substrate 110. Here, the inner surface of the substrate means the surface opposing the liquid crystal layer 3.

Each gate line 121 mainly extends in the first direction D1 as a horizontal direction, and may include a first gate electrode 124a, a second gate electrode 124b, and a third gate electrode 124c that protrude in a vertical direction.

Each reference voltage line 131 may mainly extend parallel to the first direction D1 while being separated from the gate line 121. The reference voltage line 131 may transmit a reference voltage, which may be an AC voltage or a constant DC voltage, such as a common voltage Vcom or the like.

The reference voltage line 131 may include an extension portion 131a mainly extending in the horizontal direction, a longitudinal portion 131b extended from the extension portion 131a up and down and approximately parallel to the second direction D2, and a transverse portion 131c connected to the longitudinal portion 131b and mainly extending in the first direction D1.

A gate insulating layer 140 is disposed on the gate conductors, and a semiconductor layer including a first semiconductor 154a, a second semiconductor 154b, and a third semiconductor 154c is disposed the gate insulating layer 140. The first and second semiconductors 154a and 154b may be connected to each other. The first semiconductor 154a may overlap the first gate electrode 124a, the second semiconductor 154b may overlap the second gate electrode 124b, and the third semiconductor 154c may overlap the third gate electrode 124c.

The semiconductor layer may include amorphous silicon, polycrystalline silicon, an oxide semiconductor metal oxide, or the like.

A plurality of ohmic contacts 163a and 165a may be positioned on the semiconductor layer. The ohmic contacts 163a and 165a may be formed of silicide or a material such as n+ hydrogenated amorphous silicon in which an n-type impurity is doped at a high concentration. The ohmic contacts 163a and 165a may be omitted.

A data conductor including a plurality of data lines 171 including a first source electrode 173a and a second source electrode 173b, a first drain electrode 175a, a second drain electrode 175b, a third source electrode 173c, and a third drain electrode 175c is disposed on the ohmic contacts 163a and 165a and the gate insulating layer 140.

Each data line 171 transmits a data signal, and mainly extends in the second direction D2 as a vertical direction to cross the gate line 121 and the reference voltage line 131.

The first source electrode 173a protrudes from the data line 171 toward the first gate electrode 124a to oppose the first drain electrode 175a, and the second source electrode 173b protrudes from the data line 171 toward the second gate electrode 124b to oppose the second source electrode 173b.

The first and second source electrodes 173a and 173b are connected to each other, and the second drain electrode 175b and the third source electrode 173c are connected to each other. The third source electrode 173c and the third drain electrode 175c oppose each other.

One of end portions of the third drain electrode 175c that does not oppose the third source electrode 173c may be adjacent to or overlap the reference voltage line 131.

The first gate electrode 124a, the first source electrode 173a, and the first drain electrode 175a form a first thin film transistor Qa along with the first semiconductor 154a to serve as a first switching element. The second gate electrode 124b, the second source electrode 173b, and the second drain electrode 175b form a second thin film transistor Qb along with the second semiconductor 154b to serve as a second switching element. The third gate electrode 124c, the third source electrode 173c, and the third drain electrode 175c form a third thin film transistor Qc along with the third semiconductor 154c to serve as a voltage-dividing switching element.

The gate line 121, the reference voltage line 131, and the first to third thin film transistors Qa, Qb, and Qc may be positioned corresponding to the thin film transistor region TRA shown in FIG. 4.

A first insulating layer 180a is positioned on the data conductor and the exposed portion of the semiconductors 154a, 154b, and 154c. The first insulating layer 180a may be formed of an organic insulating material or an inorganic insulating material, and may include a single layer or multiple layers.

An organic layer may be positioned on the first insulating layer 180a. For example, the organic layer may include a color filter 230. The first color filter 230 may display one of three primary colors, such as red, green, and blue, or four primary colors. The first color filter 230 is not limited to the three primary colors of red, green, and blue, but may represent cyan, magenta, yellow, white-based colors, and the like.

The color filter 230 may extend along each pixel array. The color filter 230 may include an opening (not shown) respectively positioned on the portions of the drain electrodes 175a, 175b, and 175c.

A second insulating layer 180b is formed on the color filter 230. The second insulating layer 180b may include an inorganic insulating material or an organic insulating material. The second insulating layer 180b as an overcoat for the color filter 230 prevents the color filter 230 from being exposed, thereby preventing an impurity, such as a pigment of the color filter 230, from flowing into the liquid crystal layer 3. The second insulating layer 180b may be omitted.

The first insulating layer 180a and the second insulating layer 180b include a first contact hole 185a exposing a portion of the first drain electrode 175a and a second contact hole 185b exposing a portion of the second drain electrode 175b. The first and second contact holes 185a and 185b may be positioned in the opening of the color filter 230, respectively.

The gate insulating layer 140 and the first and second insulating layers 180a and 180b may further include a contact hole 185c for partially exposing both the portion of the third drain electrode 175c and the portion of the reference voltage line 131.

A pixel electrode layer including a plurality of pixel electrodes and connection electrodes 192 and 193 is formed on the second insulating layer 180b.

The pixel electrode positioned at one pixel PX may be formed of one electrode that is entirely connected, and may include a plurality of sub-pixel electrodes. In the current exemplary embodiment, one pixel electrode including a first sub-pixel electrode 191a and a second sub-pixel electrode 191b is exemplarily described.

Figure 15:
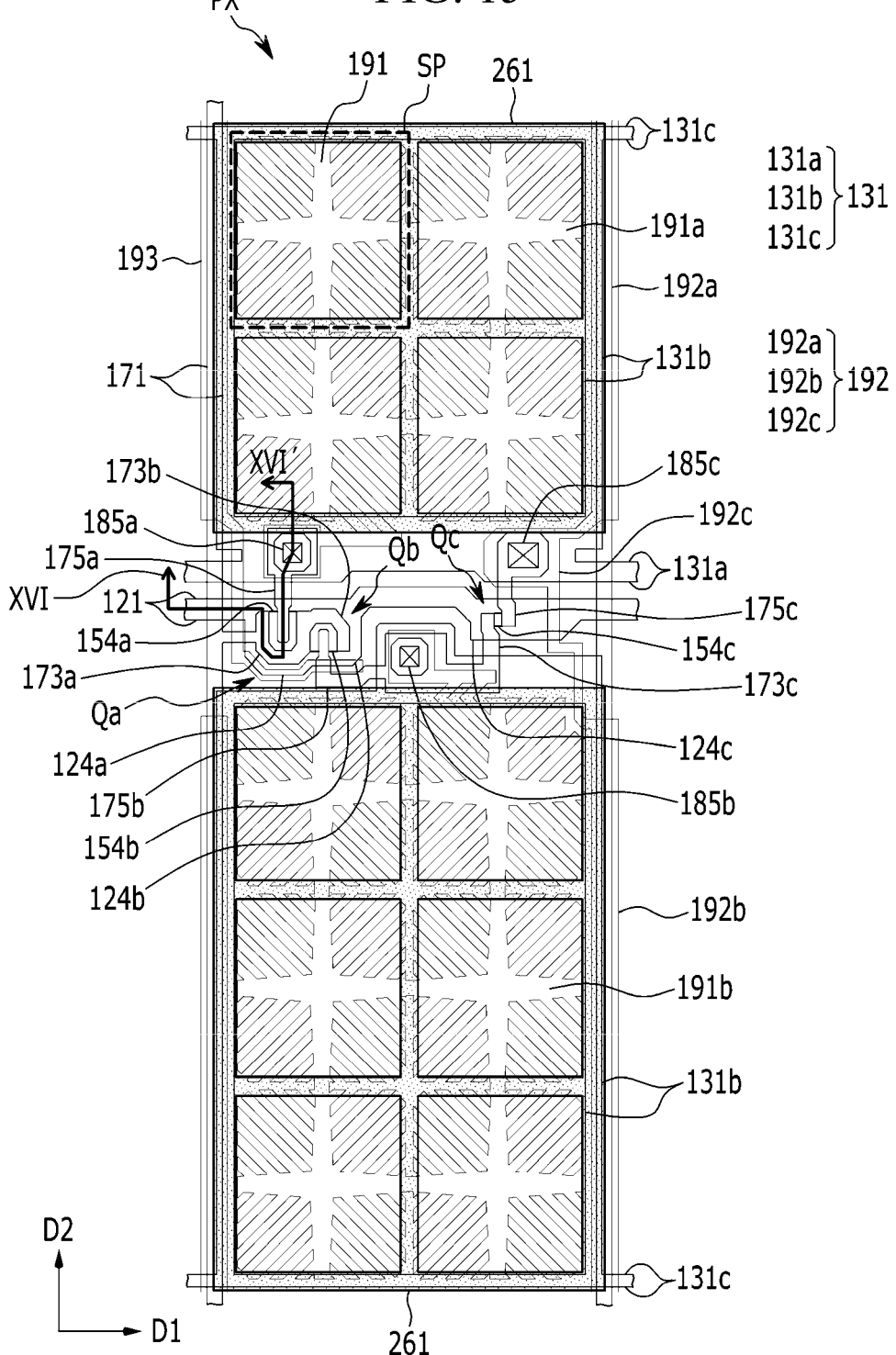
FIG. 15 is a layout view of one pixel of a liquid crystal display according to an exemplary embodiment of the present disclosure.

As described above, one pixel PX includes the plurality of unit regions SP. Accordingly, one pixel electrode may include a plurality of unit electrode portions 191 like the above-described exemplary embodiment. Also, when one pixel electrode includes the first sub-pixel electrode 191a and the second sub-pixel electrode 191b that are separated from each other, the sub-pixel electrodes 191a and 191b may include a plurality of unit electrode portions 191 like the above-described exemplary embodiment to sufficiently obtain the liquid crystal control force. FIG. 15 is an example in which the first sub-pixel electrode 191a includes four unit electrode portions 191 connected to each other and the second sub-pixel electrode 191b includes six unit electrode portions 191 connected to each other. The number of unit electrode portions 191 included in one pixel PX may be different considering the liquid crystal control force depending on the area of the pixel PX.

The structure of the unit electrode portion 191 is the same as the above-described exemplary embodiments, and as such, a detailed description thereof is omitted hereafter.

The first sub-pixel electrode 191a and the second sub-pixel electrode 191b may disposed on opposite sides of the gate line 121, the reference voltage line 131, and the first to third thin film transistors Qa, Qb, and Qc interposed therebetween; however, the arrangement shape is not limited thereto and may be variously changed.

The first subpixel electrode 191a and the second subpixel electrode 191b are physically and electrically connected to the first drain electrode 175a and the second drain electrode 175b through the contact holes 185a and 185b, respectively. The first subpixel electrode 191a may be applied with the data voltage from the drain electrode 175a, and the second subpixel electrode 191b may be applied with a divided voltage between the data voltage transmitted through the second drain electrode 175b and the reference voltage transmitted through the reference voltage line 131.

The third drain electrode 175c and the reference voltage line 131 may be connected to each other through the connection electrode 192 in the third contact hole 185c.

The connection electrode 192 may include a contact portion 192c contacting the third drain electrode 175c and the portion of the reference voltage line 131, a longitudinal portion 192a extending upward from the contact portion 192c, and a longitudinal portion 192b extending downward from the contact portion 192c. The longitudinal portions 192a and 192b are separated from the first and second sub-pixel electrodes 191a and 191b, and may be approximately parallel to the second direction D2. The longitudinal portions 192a and 192b may overlap the data line 171. The longitudinal portions 192a and 192b electrically connect a plurality of reference voltage lines 131, thereby preventing a change of the reference voltage transmitted by the reference voltage line 131. Also, the longitudinal portions 192a and 192b shield an electromagnetic field caused by the data voltage of the data line 171, thereby shielding the voltages of the adjacent pixel electrodes from being distorted by the change of the data voltage.

The connection electrode 193 and the connection electrode 192 may be alternately disposed in the first direction D1 and oppose each other via the pixel electrode. The structure and the function of the connection electrode 193 may be substantially the same as the connection electrode 192.

The pixel electrode layer may include a transparent conductive material such as indium-tin oxide (ITO), indium-zinc oxide (IZO), or a metal thin film.

The structure of the pixel PX described in the present exemplary embodiment is only one example, and numerous variations may be provided.

A light blocking member 221 is positioned on the pixel electrode layer. The light blocking member 221 may be referred to as a black matrix, and may prevent the transmission of light. Accordingly, the region where the light blocking member 221 is formed is included in the light blocking region.

The light blocking member 221 according to the present exemplary embodiment may include a main light blocking portion 221a, a spacer 221b, and a protrusion 261 like the above-described exemplary embodiment. Also, the light blocking member 221 may include at least one of dams DAM1 and DAM2 positioned in the peripheral area PA as described above.

The main light blocking portion 221a includes a portion in the light blocking region including the region where the first to third thin film transistors Qa, Qb, and Qc are positioned. The main light blocking portion 221a may prevent the light leakage between the light transmission region in which the first sub-pixel electrode 191a is positioned and the light transmission region in which the second sub-pixel electrode 191b is positioned, and between the light transmission regions of the neighboring pixels PX.

The main light blocking portion 221a may include a portion overlapping the contact holes 185a, 185b, and 185c, and this portion fills the large step on the contact holes 185a, 185b, and 185c, thereby flattening the surface and preventing the light leakage on the surrounding thereof.

The spacer 221b may be connected to the main light blocking portion 221a or separated from the main light blocking portion 221a. The spacer 221b may be positioned on a portion of at least one of the first to third thin film transistors Qa, Qb, and Qc and/or the signal line such as the gate line 121, the reference voltage line 131, and the data line 171.

The spacer 221b may be a main spacer maintaining and supporting the cell gap between the upper panel 200 and the lower panel 100 and a sub-spacer maintaining and supporting the cell gap between the upper panel 200 in the normal state (i.e., no external pressure applied) and the lower panel 100 when an external pressure is applied to the display device and the distance between the upper panel 200 and the lower panel 100 is decreased. If the spacer 221b is the sub-spacer, the top surface of the spacer 221b may not contact the inner surface of the upper panel 200 when no pressure is applied. The height of the top surface of the spacer 221b may be higher than the height of the top surface of the most of the main light blocking portion 221a.

The liquid crystal molecules 31 adjacent to the lateral surface Sa of the protrusion 261 in the cross-sectional view may be initially aligned in the direction approximately perpendicular to the lateral surface Sa, and this alignment state may also be maintained when the electric field is not generated in the liquid crystal layer 3. The other characteristics of the protrusion 261 and the effects thereof are the same as described above, and as such, a detailed description is omitted hereafter.

Figure 16:
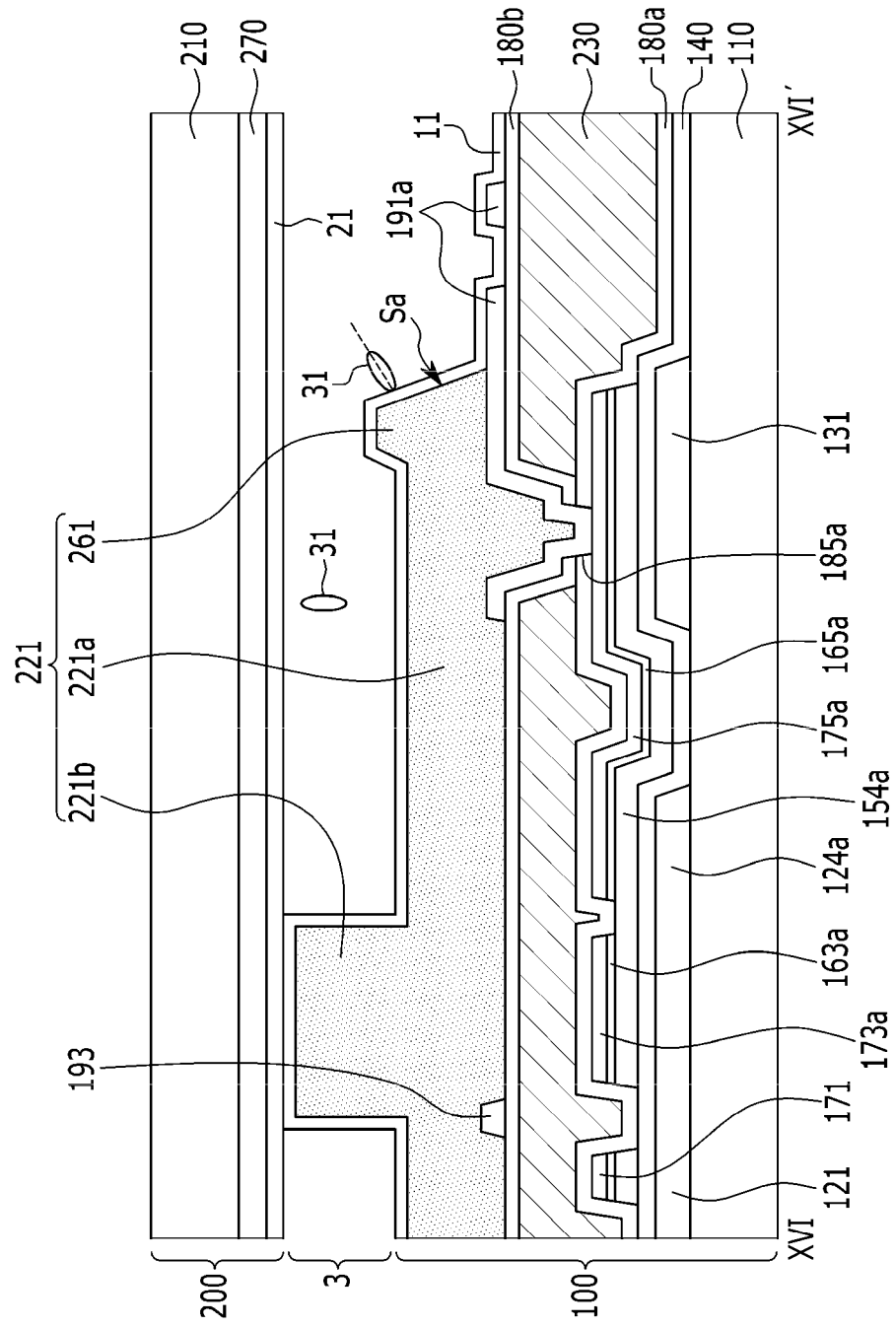
FIG. 16, FIG. 17A, and FIG. 17B are cross-sectional view of the liquid crystal display shown in FIG. 15 taken along a line XVI-XVI'.

The protrusion 261 and the above-described dams DAM1 and DAM2 may be positioned at the same layer as or may include the same material as the main light blocking portion 221a of the light blocking member 221 or the spacer 221b. The highest thickness of the protrusion 261 may be thicker than or similar to the average thickness of the main light blocking portion 221a. FIG. 16 shows an example in which the highest thickness of the protrusion 261 may be thicker than the thickness of the main light blocking portion 221a positioned therearound, but it is not limited thereto. The vertical thickness of the dams DAM1 and DAM2 positioned in the peripheral area PA in the cross-sectional view may be the same as or smaller or larger than the highest thickness of the protrusion 261. This may be approximately controlled depending on the design condition.

The height of the top surface of the spacer 221b is higher than the height of the top surface of the dams DAM1 and DAM2 and the protrusion 261.

The light blocking member 221 may include a pigment, such as carbon black, and an organic material having photosensitivity.

The light blocking member 221 of the lower panel 100 including the main light blocking portion 221a, the spacer 221b, the protrusion 261, and the dams DAM1 and DAM2 may be formed by using one photomask. This is described later.

According to an exemplary embodiment of the present disclosure, if the color filter 230 and/or the light blocking member 221 are positioned on the lower panel 100 along the first to third thin film transistors Qa, Qb, and Qc, the alignment between the light blocking member 221 and the color filter 230 and the pixel electrode and the thin film transistors Qa, Qb, and Qc may be easily adjusted, thereby reducing the alignment error.

An alignment layer 11 is formed on the light blocking member 221, and the alignment layer 11 may be a vertical alignment layer.

Referring to the upper panel 200, an opposed electrode 270 may be positioned on the inner surface of the upper substrate 210. The opposed electrode 270 with a surface shape without a cutout may be formed in the whole plate of the entire surface of the upper substrate 210. The opposed electrode 270 may be transmitted with a common voltage Vcom of a predetermined magnitude. The opposed electrode 270 may include the transparent conductive material such as ITO, IZO, and a metal thin film.

An alignment layer 21 is formed on the opposed electrode 270, and the alignment layer 21 may be a vertical alignment layer.

The liquid crystal layer 3 includes the plurality of liquid crystal molecules 31. The liquid crystal molecules 31 may have negative dielectric anisotropy and may be initially aligned in the direction approximately perpendicular to the surfaces of the panels 110 and 210 when no electric field is generated in the liquid crystal layer 3. The liquid crystal molecules 31 may be pretilted in the direction approximately perpendicular to the surface of the protrusion 261, particularly around the protrusion 261.

The pixel electrode and the opposed electrode 270 are applied with the voltages to generate the electric field in the liquid crystal layer 3 such that the arrangement direction of the liquid crystal molecules 31 is controlled, thereby displaying the image.

Alternatively, the color filter 230 may be positioned on the upper panel 200. In this case, the color filter 230 may be positioned between the upper substrate 210 and the opposed electrode 270, and an insulating layer (not shown) may be further positioned between the color filter 230 and the liquid crystal layer 3. In this case, the lower panel 100 may further include a third insulating layer (not shown) positioned between the first insulating layer 180a and the second insulating layer 180b. The third insulating layer may include an organic material and may provide the flat upper surface.

Figure 17A:
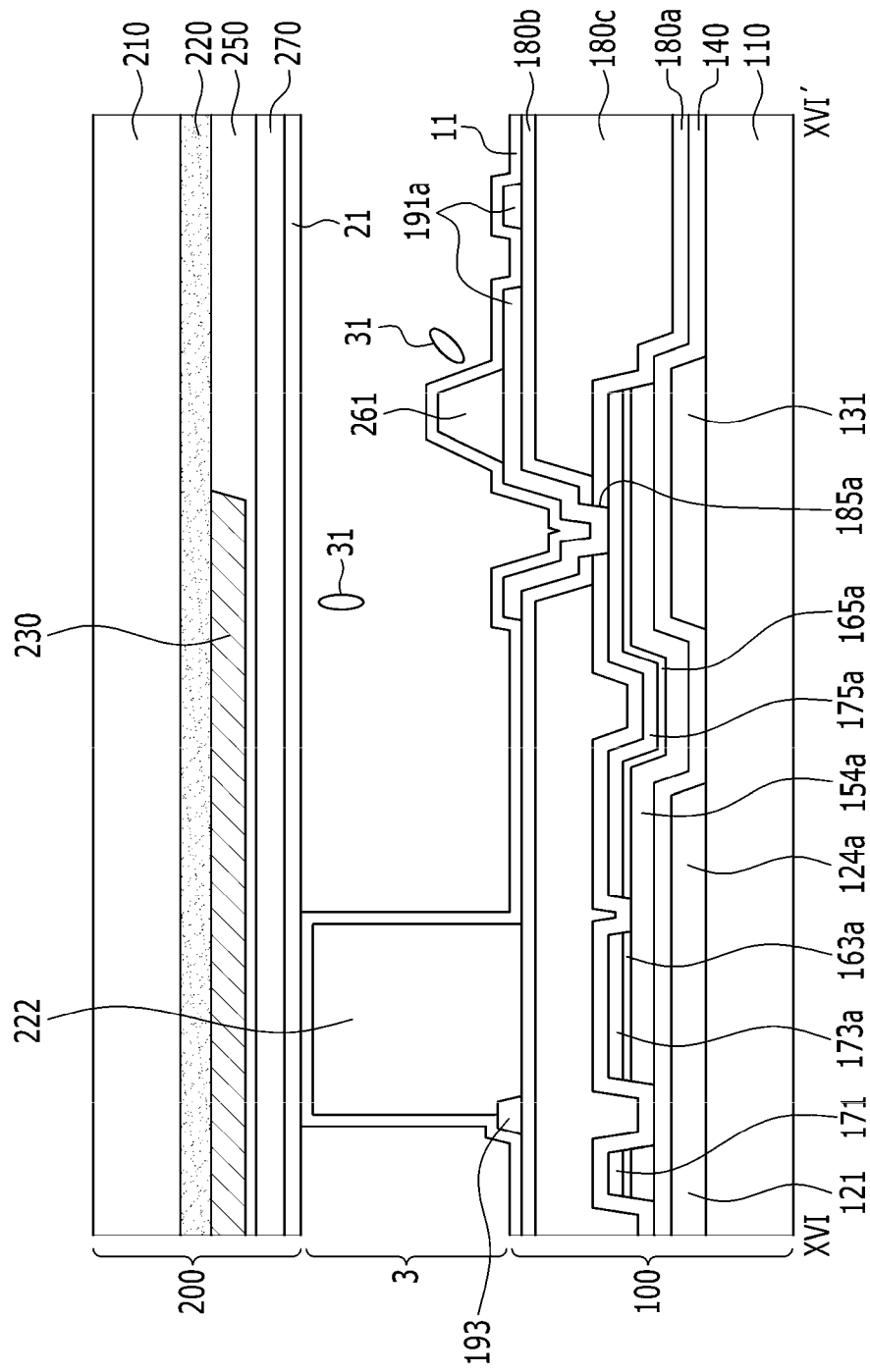
Figure 17B:
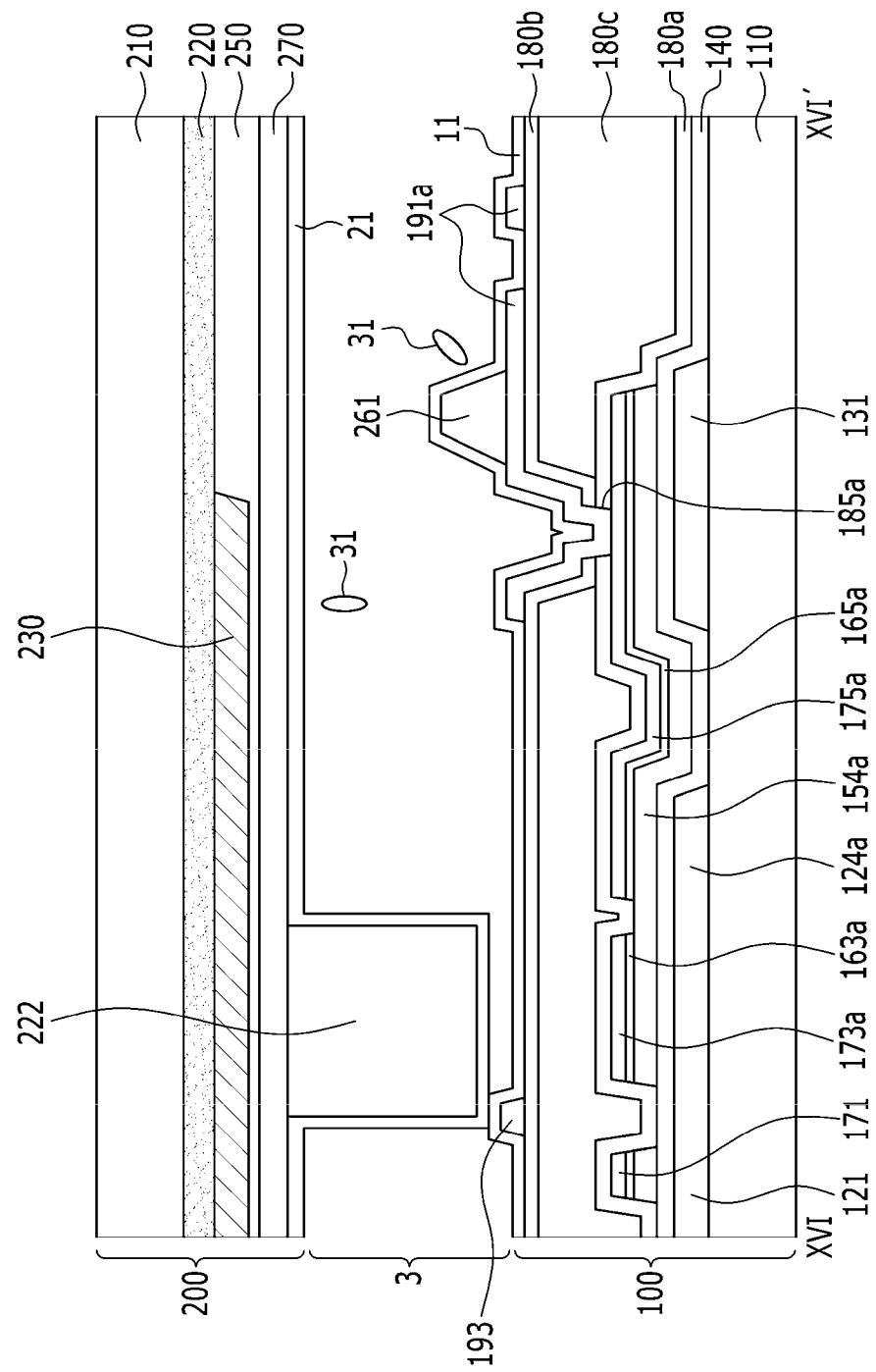

FIG. 17A and FIG. 17B show the cross-sectional structure of another example of the liquid crystal display shown in FIG. 15.

Figure 20:
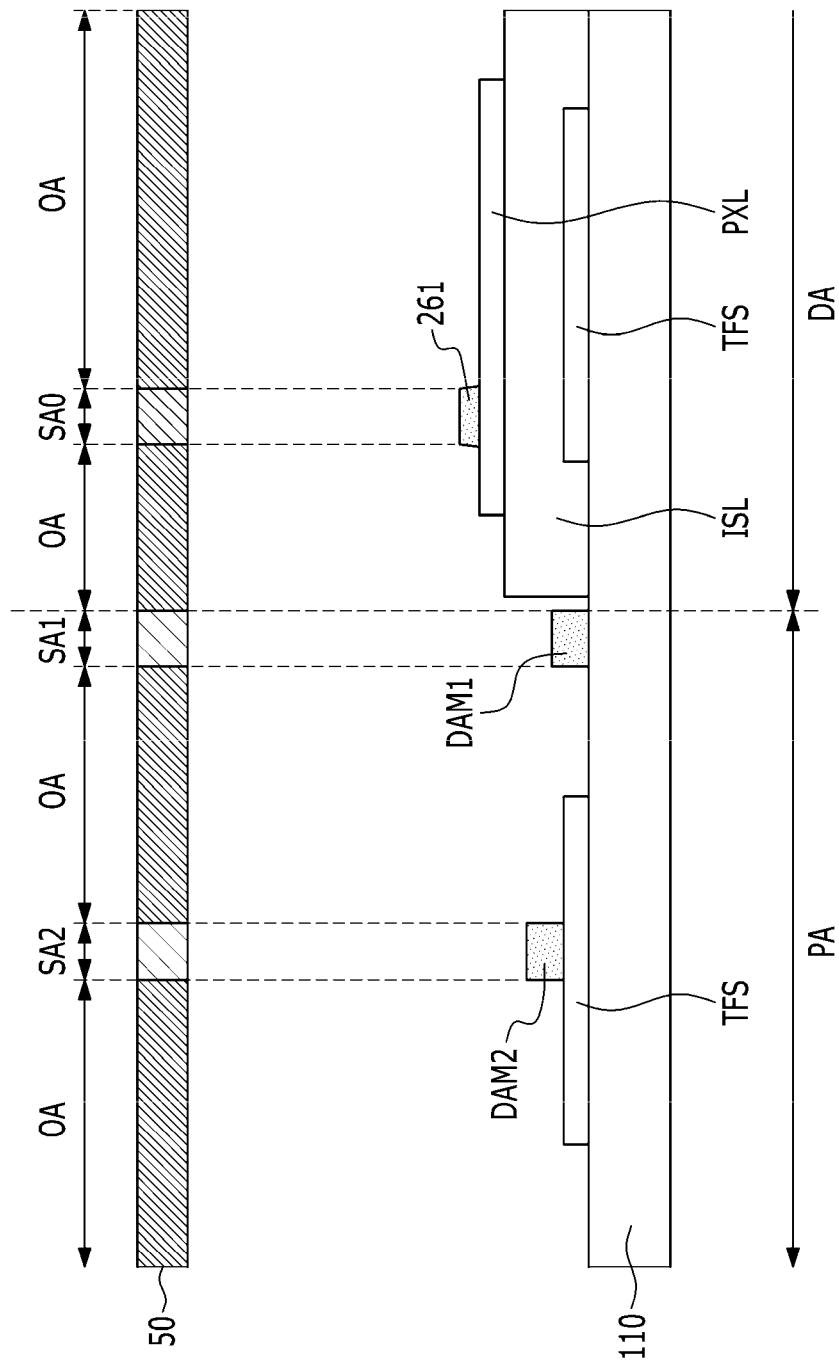

Referring to FIG. 17A, FIG. 17B, and FIG. 20, at least one of the color filter 230 and the light blocking member 220 may be positioned in the upper panel 200. FIG. 17A and FIG. 17B show examples in which the color filter 230 and the light blocking member 220 are both positioned in the upper panel 200.

The light blocking member 220 may be positioned between the upper substrate 210 and the color filter 230 or may be positioned on the color filter 230. An overcoat 250 may be positioned on the light blocking member 220 and the color filter 230, and the opposed electrode 270 may be positioned on the overcoat 250. The light blocking member 220 may have a similar structure and function to the above-described main light blocking portion 221a.

The lower panel 100 may include a third insulating layer 180c positioned between the first insulating layer 180a and the second insulating layer 180b. The third insulating layer 180c may include an organic material and may provide the flat upper surface.

Referring to FIG. 17A, the lower panel 100 is the same as most of the above-described lower panel, however a spacer 222 and the protrusion 261 may be positioned on the pixel electrode layer. The height of the top surface of the spacer 222 is higher than the top surface of the dams DAM1 and DAM2 and the protrusion 261.

Referring to FIG. 17B, the present exemplary embodiment is the same as most of FIG. 17A; however, the spacer 222 may be positioned in the upper panel 200. In this case, the dams DAM3 and DAM4 of the upper panel may be formed with the same material and layer in the same process as the spacer 222. In this case, the height of the top surface of the spacer 222 is higher than the height of the top surface of the dams DAM3 and DAM4.

The spacer 222 may have an island shape. The spacer 222 may be positioned to overlap the light blocking region of the pixel PX, particularly to overlap a portion of at least one of the first to third thin film transistors Qa, Qb, and Qc and/or the signal line such as the gate line 121, the reference voltage line 131, and the data line 171. The spacer 222 may have a similar structure and function as the above-described spacer 221b.

The protrusion 261 may have the structure and function according to the above-described several exemplary embodiments. The protrusion 261 may be positioned at the same layer as the above-described dams DAM1 and DAM2, may include the same material, and may be formed in the same process. This is described later. When the spacer 222 is positioned in the lower panel 100 as shown in FIG. 17A, the spacer 222 may be positioned at the same layer as the protrusion 261, and the dams DAM1 and DAM2 and may include the same material.

The material together included in the protrusion 261 and the dams DAM1 and DAM2 may be transparent or may include a light blocking material. When the protrusion 261 includes the transparent material, little or no light is transmitted in the region where the protrusion 261 is formed such that most of the protrusion 261 may be included in the light blocking region.

The highest thickness of the protrusion 261 in the cross-sectional view is smaller than thickness of the spacer 222 in the cross-sectional view.

According to an exemplary embodiment of the present disclosure, the protrusion 261 may be positioned between the pixel electrode including the unit electrode portion 191 and the liquid crystal layer 3; however, the protrusion 261 may be alternatively positioned at the layer between the lower substrate 110 and the pixel electrode. When the protrusion 261 is positioned between the lower substrate 110 and the pixel electrode, the step of the protrusion 261 is transmitted to the inner surface of the lower panel 100 such that the highest surface positioned on the protrusion 261 is protruded to the liquid crystal layer 3 such that the liquid crystal molecules 31 may be pretilted.

Differently from FIG. 17A and FIG. 17B, the light blocking member 220 may be positioned in the lower panel 100. In this case, the third insulating layer 180c may be omitted, and the light blocking member 220 may be positioned thereon. Otherwise, the light blocking member 220 may be positioned on or under the third insulating layer 180c.

Next, a manufacturing method of the liquid crystal display according to an exemplary embodiment of the present disclosure is described with reference to FIG. 18 to FIG. 25 as well as the above-described drawings.

Figure 18:
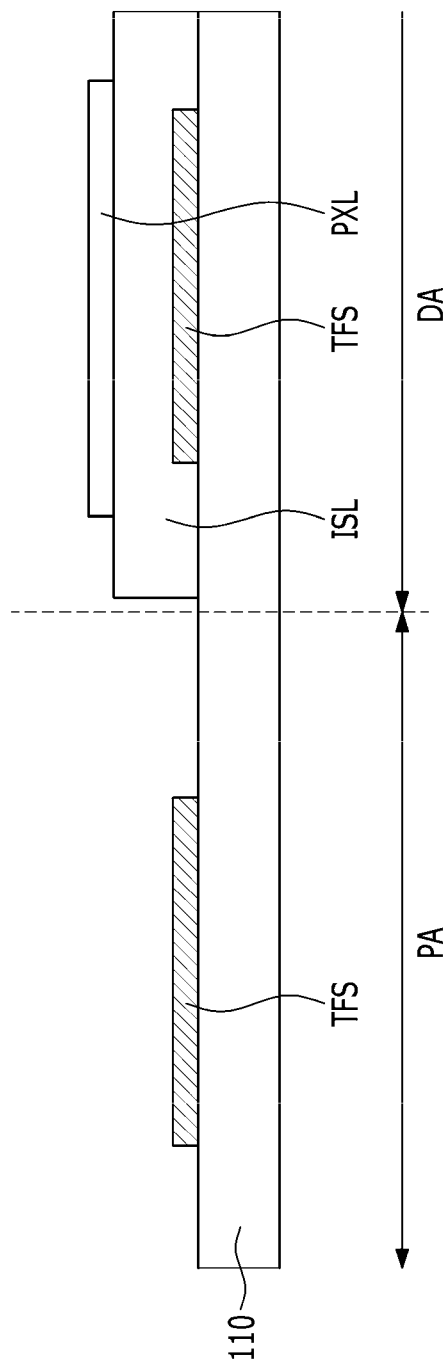
FIGS. 18, 19, 20 and 21 are cross-sectional views sequentially showing a partial process of manufacturing one panel of a liquid crystal display according to an exemplary embodiment of the present disclosure.

Firstly, referring to FIG. 18, the lower substrate 110 including the insulating material is provided, and a plurality of thin film layers TFS are formed thereon.

The lower substrate 110 includes the display area DA and the peripheral area PA positioned in the vicinity thereof, and the thin film layer TFS may include the portion positioned in the display area DA and the portion positioned in the peripheral area PA. At least a portion among the plurality of thin film layers TFS may be patterned in the plan view. The plurality of thin film layers TFS may include at least one conductive layer, the semiconductor layer, and at least one insulating layer.

Next, an insulating layer ISL is formed on the lower substrate 110 and the thin film layer TFS. The insulating layer ISL may include an inorganic insulating material or/and an organic insulating material, and may be patterned. FIG. 18 shows an example in which at least a portion of the insulating layer ISL may be removed in the peripheral area PA.

Next, the transparent conductive material such as ITO, ITO is deposited and patterned on the insulating layer ISL to form a pixel electrode layer PXL including a plurality of pixel electrodes. The plurality of pixel electrodes are mainly positioned in the display area DA.

Figure 19:
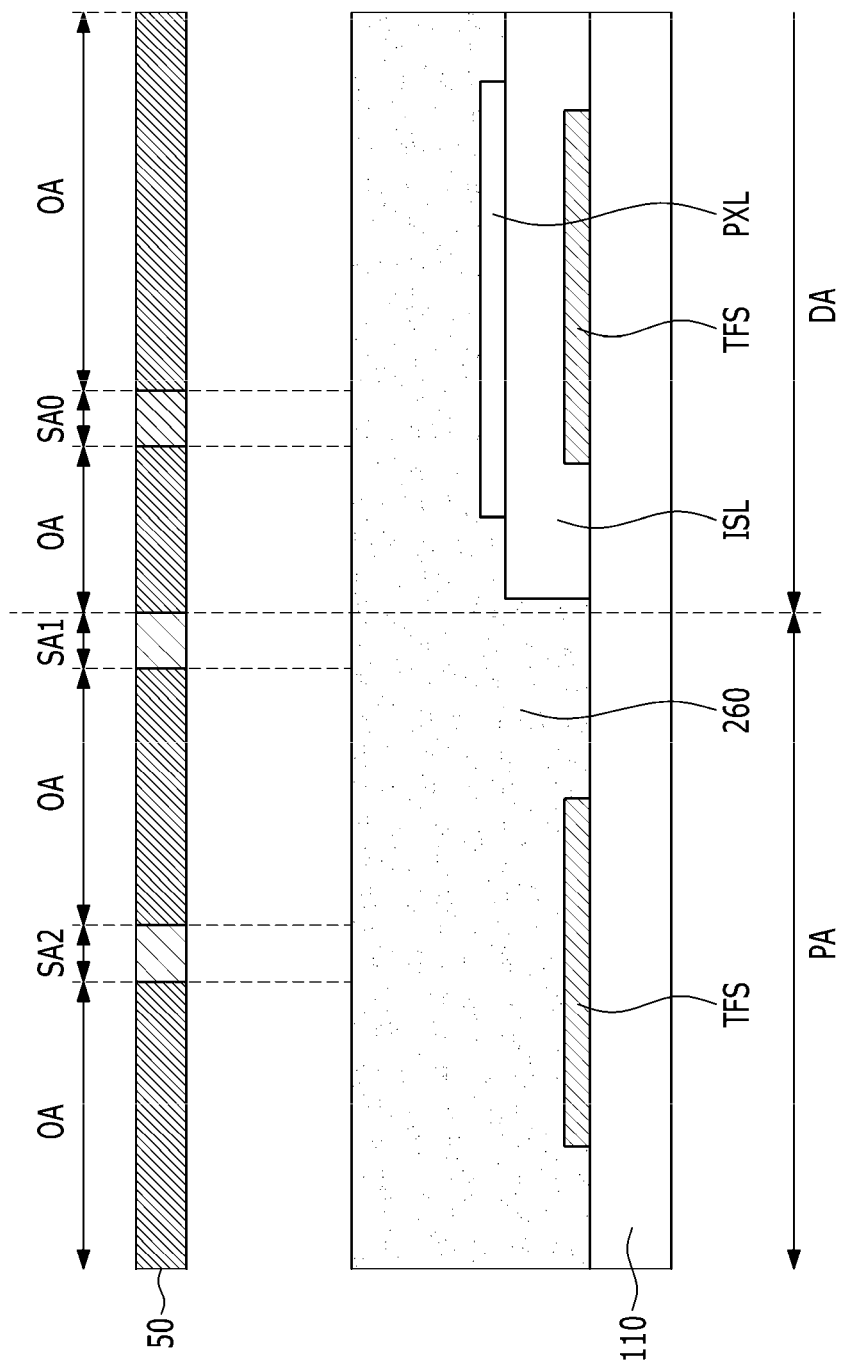

Next, referring to FIG. 19, a photosensitive material 260 is deposited on the entire surface of the lower substrate 110. The photosensitive material 260 may be the same as a material of the dams DAM1 and DAM2, and the protrusion 261 may include an organic material.

Next, a photomask 50 is positioned on the photosensitive material 260, and the exposure is performed. The photomask 50 includes portions having different light transmittances. For example, when the photosensitive material 260 has negative photosensitivity such that a portion irradiated by a light is maintained, among the photomask 50, the regions SA1 and SA2 corresponding to the portions where the dams DAM1 and DAM2 are formed and the region SA0 corresponding to the portion where the protrusion 261 is formed have predetermined light transmittance that is not 0, and the region OA corresponding to the portion where the photosensitive material 260 is mainly removed may have a lower light transmittance. The region OA of the photomask 50 may be substantially the light blocking region and may be opaque. The photomask 50 may further include a light transmission region (not shown) corresponding to the position where the photosensitive material 260 is maintained, and a light semi-transmission region or a light blocking region of another position may be further included.

Particularly, the regions SA0, SA1, and SA2 of the photomask 50 may be the light semi-transmission region, and thus, the regions SA0, SA1, and SA2 of the photomask 50 may have a halftone or a plurality of slits, or a size of the pattern may be controlled to control the light transmittance.

The cross-sectional thicknesses of the dams DAM1 and DAM2 and the protrusion 261 are different from each other, and the light transmittance of the regions SA1 and SA2 of the photomask 50 and the light transmittance of the region SA0 may be different. For example, the thickness of the protrusion 261 is smaller than the thickness of the dams DAM1 and DAM2, and the light transmittance of the region SA0 of the photomask 50 may be lower than the light transmittance of the region SA1 and SA2 of the photomask 50. Likewise, when the thicknesses of the dams DAM1 and DAM2 of the different positions are different, the light transmittance of the region SA1 and the region SA2 of the photomask 50 may be different.

Alternatively, when the photomask 50 has positive photosensitivity, each light transmittance of the regions SA0, SA1, SA2, and OA of the photomask 50 may be reversely changed. That is, the region OA of the photomask 50 may be the light transmission region, the light transmittance of the regions SA0, SA1, and SA2 may be controlled to be different, and the region that was the light transmission region may be the light blocking region.

Next, referring to FIG. 20, the photosensitive material 260 exposed through the photomask 50 is developed to form a plurality of protrusions 261 corresponding to the region SA0 of the photomask 50 and dams DAM1 and DAM2 corresponding to the regions SA1 and SA2 of the photomask 50. FIG. 20 shows the example in which the cross-sectional thickness of the protrusion 261 is smaller than the cross-sectional thickness of the dams DAM1 and DAM2. The photosensitive material 260 of the region except for the protrusion 261 and the dams DAM1 and DAM2 may be mainly removed, and there may be a portion where the photosensitive material 260 is maintained with a predetermined thickness.

When the protrusion 261 includes the inclined corner portion 261d like the above-described exemplary embodiment, the photomask 50 corresponding to the inclined corner portion 261d may have a lower light transmittance than the other portion of the protrusion 261, for example, the region corresponding to the transverse portion 261a or the longitudinal portion 261b. As described above, the light transmittance of the photomask is gradually decreased in the direction that the thickness of the inclined corner portion 261d is decreased, thereby forming the smooth inclination of the inclined corner portion 261d. In this way, the region of the photomask 50 of which the light transmittance is gradually changed may be formed by gradually controlling a number of the slits or a tone degree of the halftone.

As described above, the dams DAM1 and DAM2 to control the edge position of the alignment layer 11 and the protrusion 261 to control the alignment of the liquid crystal molecules 31 are formed together of the same material and at the same layer by using the same photomask 50, thereby reducing the manufacturing cost and the manufacturing time and simplifying the manufacturing process in the present exemplary embodiment.

Alternately, the formation of the protrusion 261 and the dams DAM1 and DAM2 may be performed before forming the pixel electrode layer PXL.

Figure 21:
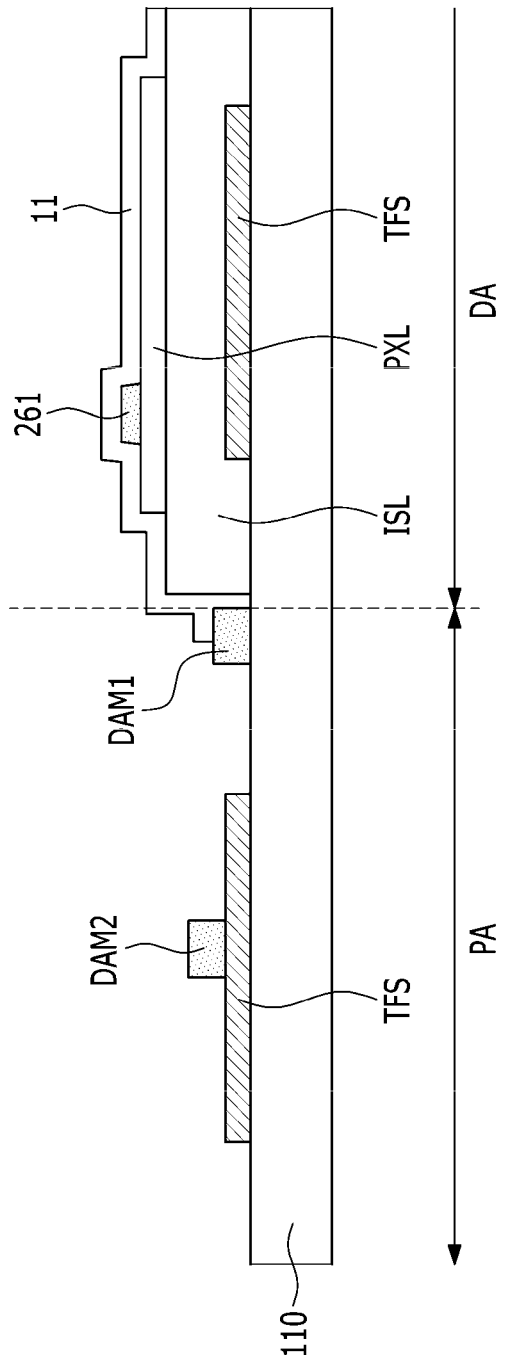

Next, referring to FIG. 21, an aligning agent is coated and dried on the entire inner surface of the lower substrate 110 formed with the dams DAM1 and DAM2 and the protrusion 261 to form the alignment layer 11. In this case, the alignment layer 11 is spread in the entire surface of the display area DA, and the spread may be primary prevented by the dam DAM1 at the boundary of the peripheral area PA and the display area DA of the lower substrate 110. Even if the aligning agent overflowing over the dams DAM1 is generated, the spread is further prevented by at least one of dams DAM2 positioned next the dams DAM1 such that the position of the edge of the alignment layer 11 may be controlled, thereby further reducing the width of the peripheral area PA.

The lower panel may be completed through this process.

Figure 22:
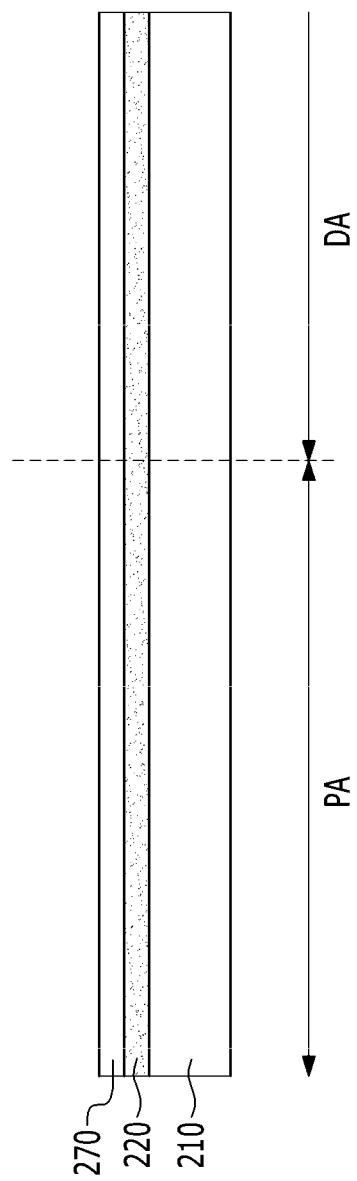
FIG. 22, 23, 24 and FIG. 25 are cross-sectional views sequentially showing a partial process of manufacturing one panel of a liquid crystal display according to an exemplary embodiment of the present disclosure.

Next, referring to FIG. 22, the upper substrate 210 including the insulating material is provided, and a light blocking material is coated to form the light blocking member 220. Alternatively, the light blocking member 220 may be included in the lower panel.

Although not shown, the color filter (not shown) may be further formed on the upper substrate 210. Alternatively, the color filter may be positioned in the lower panel.

Next, a conductive material, such as ITO or IZO, is deposited on the light blocking member 220 to form the opposed electrode 270.

Figure 23:
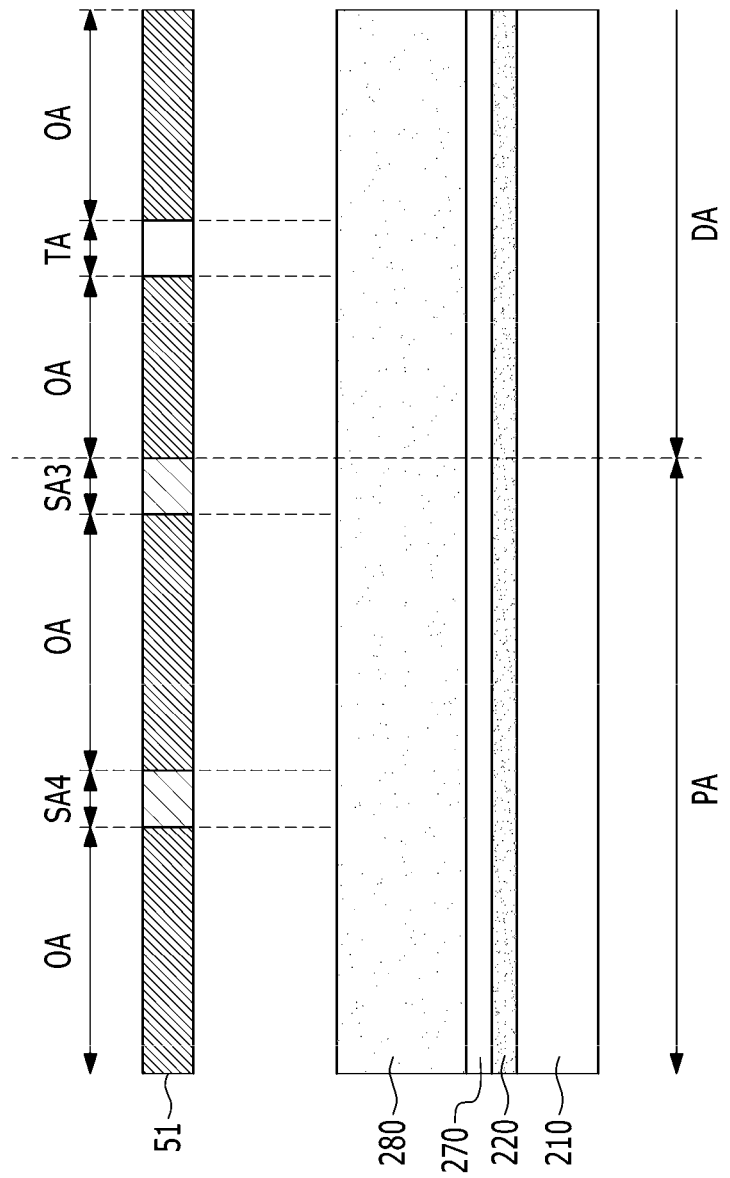

Next, referring to FIG. 23, a photosensitive material 280 is deposited on the opposed electrode 270. The photosensitive material 280 as the material of the spacer may include an organic material.

Next, a photomask 51 is disposed on the photosensitive material 280 and the exposure is performed. The photomask 51 includes the portions having the different light transmittance. For example, when the photosensitive material 280 has the negative photosensitivity to be maintained by the irradiated light, in the photomask 51, the regions SA3 and SA4 corresponding to the portions where the dams DAM3 and DAM4 are formed respectively may have a predetermined light transmittance other than 0. In addition, when forming the spacer on the upper substrate 210, in the photomask 51, the region TA corresponding to the portion where the spacer is formed and the region corresponding to the portion where the rest of the photosensitive material 280 is maintained may have higher light transmittance than the regions SA3 and SA4. In the photomask 51, the rest of the region OA corresponding to the portion where the photosensitive material 280 is mainly removed may have the lowest light transmittance and may substantially be the light blocking region.

Figure 24:
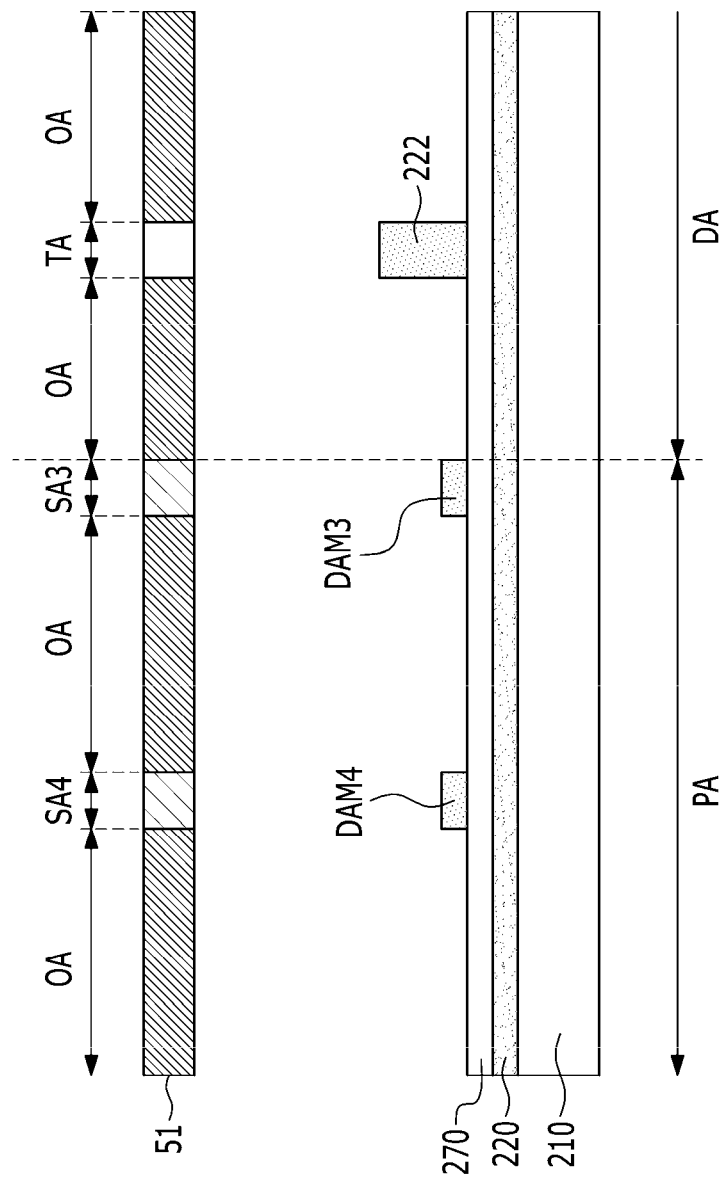

Next, referring to FIG. 24, the photosensitive material 280 exposed through the photomask 51 is developed to form the spacer 222 corresponding to the region TA of the photomask 51 and the dams DAM3 and DAM4 corresponding to the region SA3 and SA4 of the photomask 51. The photosensitive material 280 of the region except for the spacer 222 and the dams DAM3 and DAM4 may be partially removed, and a portion of the photosensitive material 280 of the predetermined thickness may be maintained.

Figure 25:
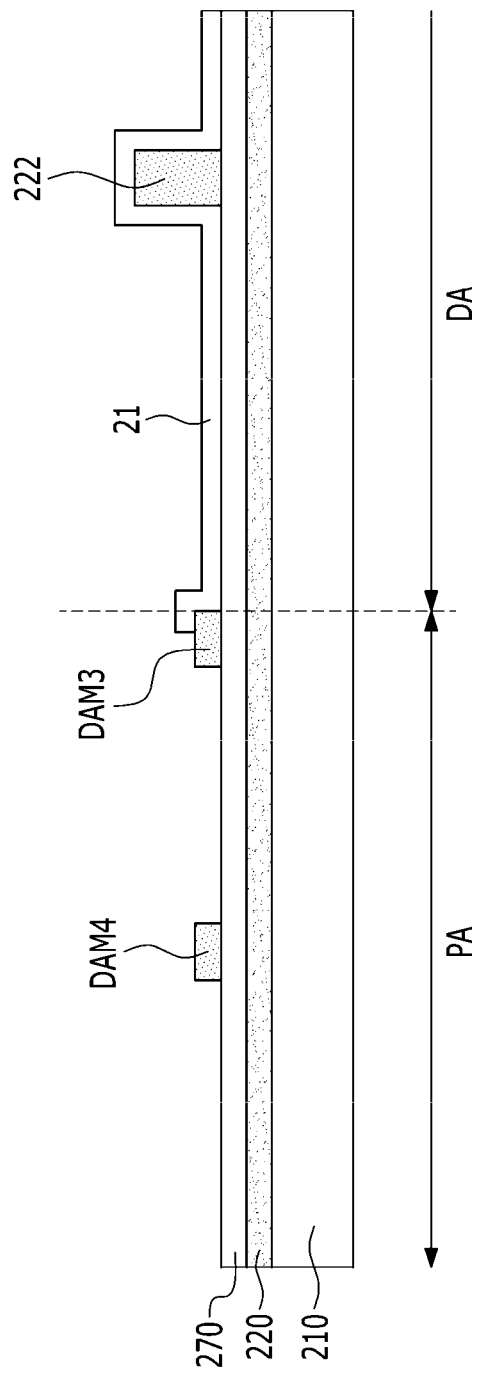

Next, referring to FIG. 25, the aligning agent is coated and dried on the inner surface of the upper substrate 210 formed with the dams DAM3 and DAM4 and the spacer 222 to form an alignment layer 21. In this case, the alignment layer 21 is spread on the entire surface of the display area DA, and the spread thereof is primary stopped by the dams DAM3 at the boundary of the peripheral area PA and the display area DA of the upper substrate 210. Even if the aligning agent overflows the dams DAM3, the aligning agent is prevented from being further spread by at least one of dams DAM4 positioned next to the dams DAM3 such that the position of the edge of the alignment layer 21 may be controlled, thereby further reducing the width of the peripheral area PA.

Accordingly, the upper panel may be completed.

A sealant 310 is positioned between the lower panel and the upper panel, which are combined to manufacture the liquid crystal display according to an exemplary embodiment of the present disclosure, and the structure thereof may be the same as the liquid crystal display shown in FIG. 1 to FIG. 15, and FIG. 17B.

Next, a manufacturing method of the liquid crystal display according to an exemplary embodiment of the present disclosure is described with reference to FIG. 26 and FIG. 27 as well as the above-described drawings.

The manufacturing method of the liquid crystal display according to the present exemplary embodiment is the same as most of the exemplary embodiment shown in FIG. 18 to FIG. 25; however, the spacer 222 may also be formed when forming the protrusion 261 and the dams DAM1 and DAM2 of the lower panel.

Figure 26:
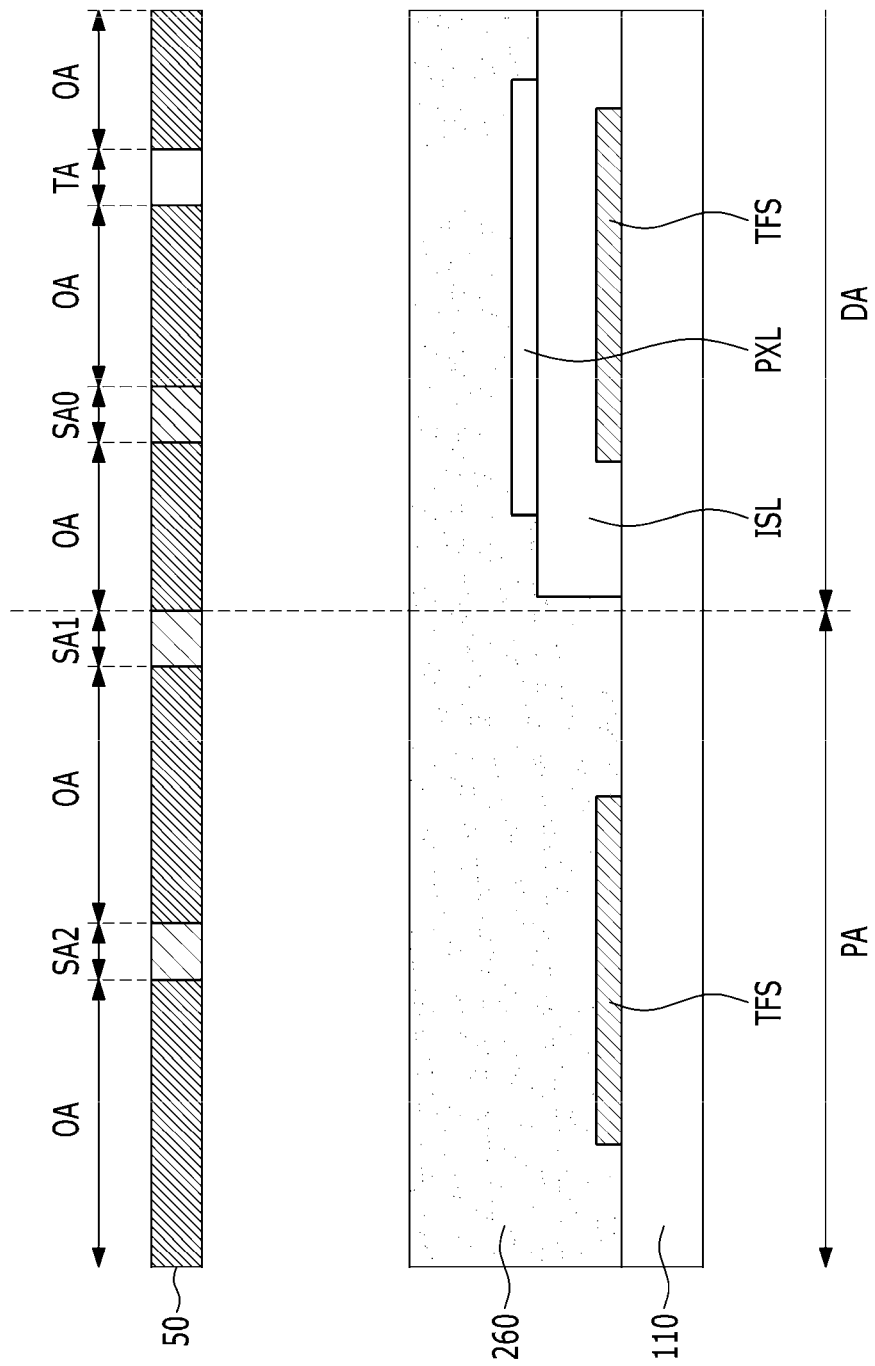
FIG. 26 and FIG. 27 are cross-sectional views showing a partial process of manufacturing one panel of a liquid crystal display according to an exemplary embodiment of the present disclosure.

Referring to FIG. 26, as described above, the photosensitive material 260 is coated on the lower substrate 110, the photomask 50 is disposed for the exposure, and the photomask 50 may further include the region TA corresponding to the position to form the spacer. The region TA of the photomask 50 may have a higher light transmittance than the region SA0, SA1, and SA2.

Figure 27:
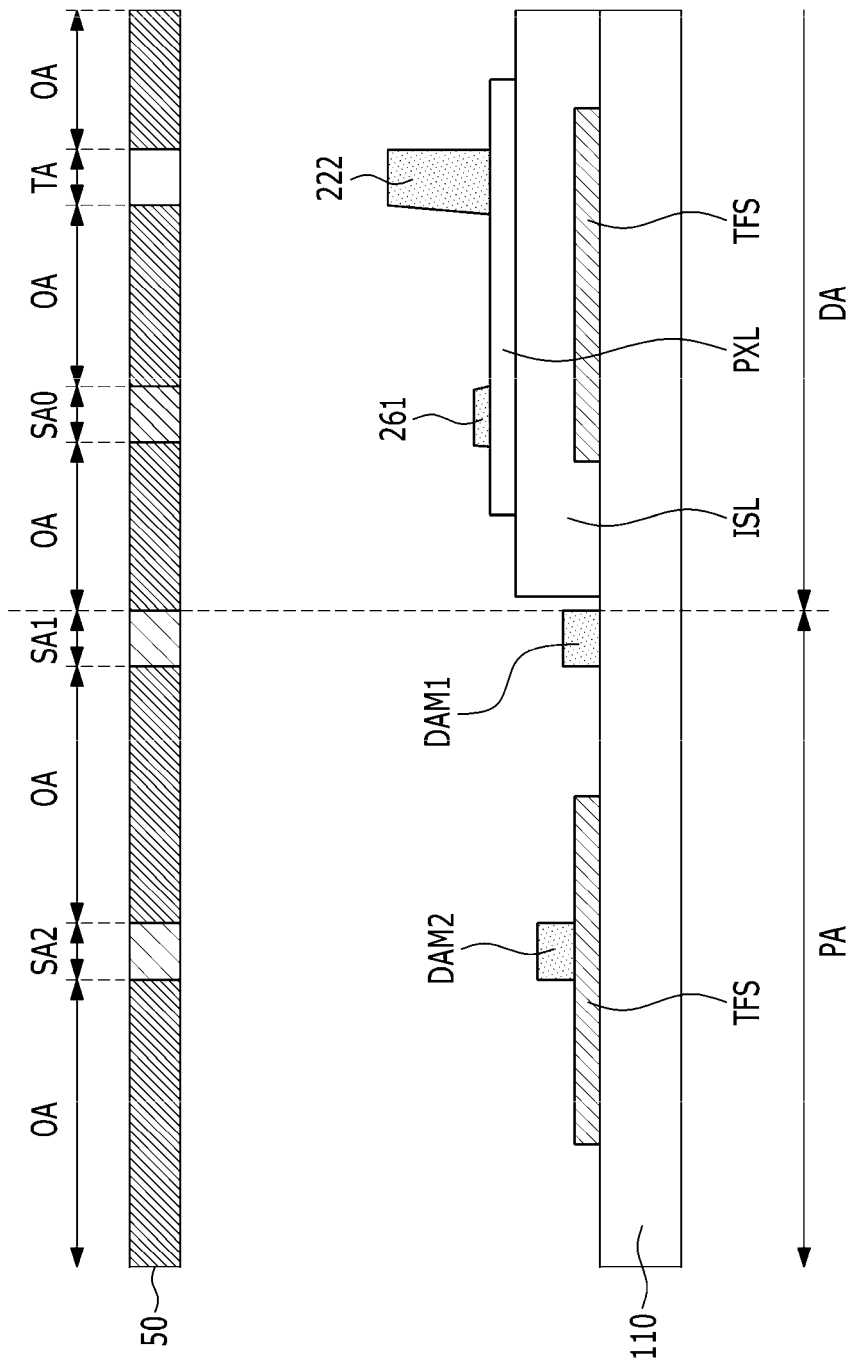

Accordingly, as shown in FIG. 27, after the exposure and the developing through the photomask 50, the spacer 222 having the higher cross-sectional thickness than the protrusion 261 and the dams DAM1 and DAM2 may be formed on the lower substrate 110. In the present exemplary embodiment, the photosensitive material 260 may be transparent or may include the light blocking material.

The structure of the thus manufactured liquid crystal display may be the same as that of the liquid crystal display shown in FIG. 1 to FIG. 15 and FIG. 17A. In this case, the spacer may be not positioned in the upper panel, and the dams DAM3 and DAM4 positioned in the upper panel may be formed through a separate photolithography process or may be formed in the same process along with the other layers positioned in the upper panel.

Figure 28:
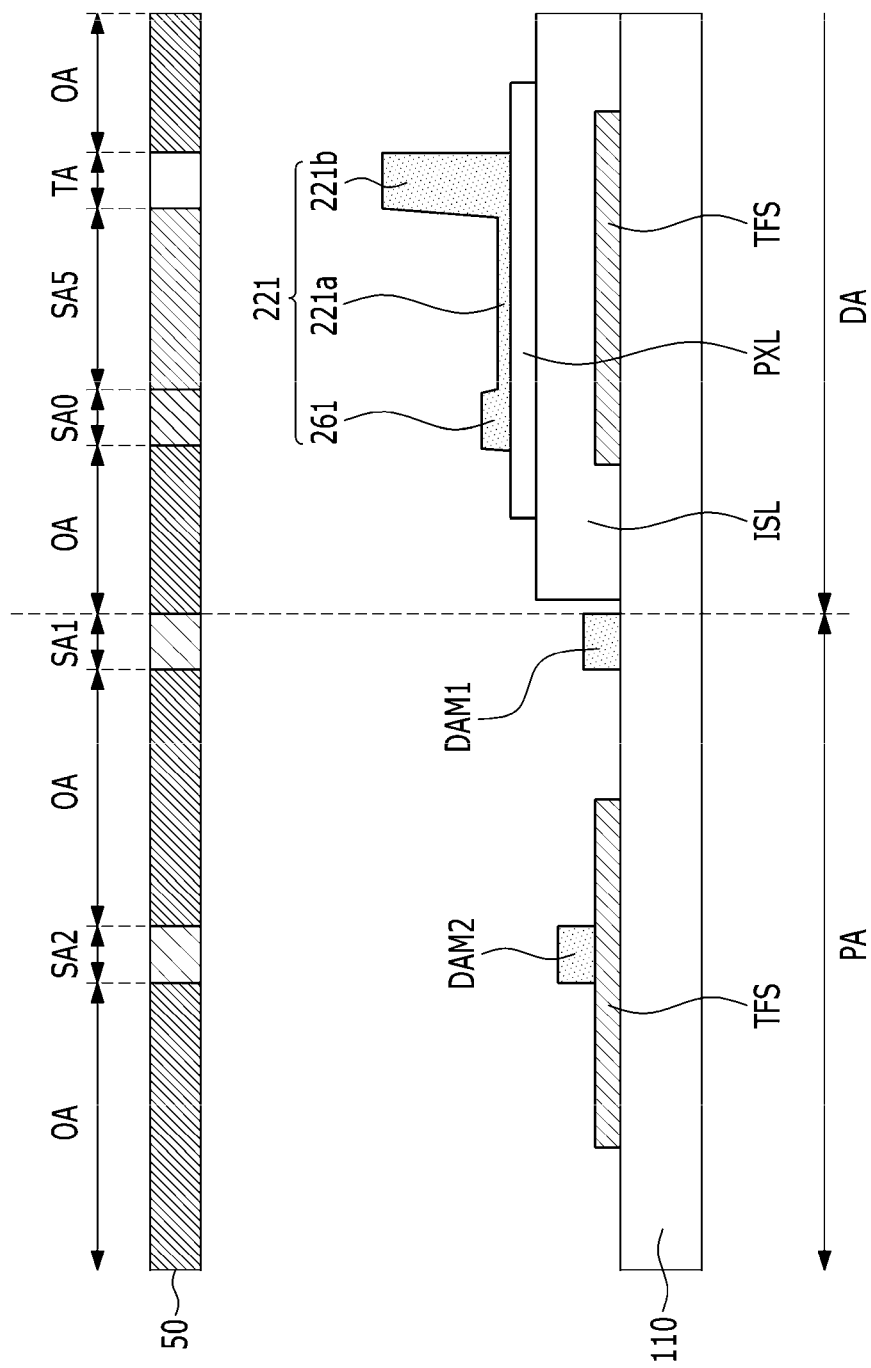
FIG. 28 is a cross-sectional view showing a partial process of manufacturing one panel of a liquid crystal display according to an exemplary embodiment of the present disclosure.

Finally, the manufacturing method of the liquid crystal display according to an exemplary embodiment of the present invention will be descried with reference to FIG. 28 as well as the above-described drawings.

The manufacturing method of the liquid crystal display according to the present exemplary embodiment is the same as most of the exemplary embodiment shown in FIG. 18 to FIG. 25, however the light blocking member and the spacer may be formed when forming the lower panel, not the upper panel.

Referring to FIG. 28, the photomask 50 disposed after coating the photosensitive material 260 on the lower substrate 110 may further include the region TA corresponding to the position to form the spacer and the region SA5 corresponding to the position to form the main light blocking portion. The region TA of the photomask 50 may have a higher light transmittance than the regions SA0, SA1, and SA2, and the region SA5 may have a lower light transmittance than the region TA. The light transmittance of the region SA5 may be lower than the light transmittance of the region SA0; however, it is not limited thereto, and it may be higher than or equal thereto.

After the exposure by using the photomask 50 shown in FIG. 28, the dams DAM1 and DAM2 respectively corresponding to the light semi-transmission regions SA1 and SA2, the protrusion 261 corresponding to the light semi-transmission region SA0, the main light blocking portion 221a corresponding to the light semi-transmission region SA5, and the spacer 221b corresponding to the light transmission region TA are formed.

In the present exemplary embodiment, the photosensitive material 260 includes the light blocking material.

The structure of the manufactured liquid crystal display may be the same as that of the liquid crystal display shown in FIG. 1 to FIG. 15 and FIG. 16. That is, the light blocking member 221 may include the main light blocking portion 221a, the spacer 221b, and the protrusion 261. In this case, the spacer may not be positioned in the upper panel, and the dams DAM3 and DAM4 positioned in the upper panel may be formed through a separate photolithography process or may be formed together in the same process as a different layer positioned in the upper panel.

Figure 29:
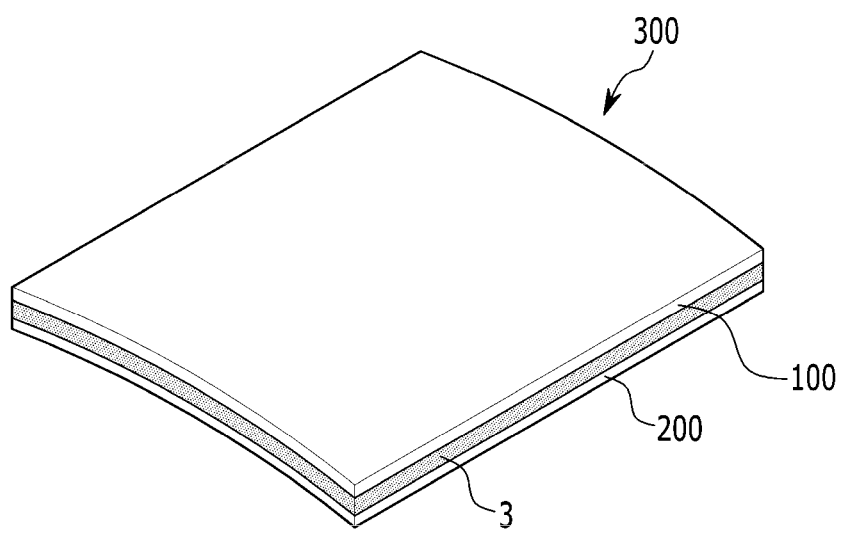
FIG. 29 is a perspective view of a display panel according to an exemplary embodiment of the present disclosure.

Referring to FIG. 29, the liquid crystal display according to an exemplary embodiment of the present disclosure may be a curved display device. That is, the display panel 300 may include a curved surface that is bent according to at least one direction. The display panel 300 includes the lower panel 100 and the upper panel 200 opposing each other and the liquid crystal layer 3 positioned therebetween, and the surface of the lower substrate of the lower panel 100 and the surface of the upper substrate of the upper panel 200 have substantially the same curved shape.

When the display panel 300 has the curved shape, in the process of bending the lower panel 100 and the upper panel 200, the pattern of the lower panel 100 and the pattern of the upper panel 200 may be misaligned, and a defect may be generated in the adhering state of the above-described sealant. According to an exemplary embodiment of the present disclosure, if the protrusion 261 is formed in the lower panel 100, it may not be necessary to form the cutout for the alignment of the liquid crystal molecules 31 in the opposed electrode 270 of the upper panel 200 such that the display quality defect, such as texturing due to a misalignment between the lower panel 100 and the upper panel 200, may be improved when realizing the curved display panel 300. Furthermore, like the above-described exemplary embodiment, when forming the light blocking member 221 in the lower panel 100, the reduction of the aperture ratio due to the misalignment between the lower panel 100 and the upper panel 200 may be largely reduced compared with the case in which the light blocking member is positioned in the upper panel 200.

According to an exemplary embodiment of the present disclosure, by forming the dams DAM1, DAM2, DAM3, or DAM4, the aligning agent is suppressed from being spread to the region where the sealant 310 is positioned such that the contact area of the alignment layers 11 and 21 and the sealant 310 is minimized, thereby preventing the adherence deterioration of the sealant 310. Accordingly, in the case of the curved display panel 300, the adherence of the sealant 310 is not weakened, thereby lowering the separation possibility of the lower panel 100 and the upper panel 200. Accordingly, by applying an exemplary embodiment of the present disclosure to the curved display panel 300, the quality of the display panel 300 may be further improved.

While the present system and method have been described in connection with what is presently considered to be practical exemplary embodiments, the present system and method are not limited to the disclosed embodiments. On the contrary, the present disclosure is intended to cover various modifications and equivalent arrangements included within the spirit and scope of the appended claims.

DESCRIPTION OF SYMBOLS 50, 51: photomask
300: display panel
191: unit electrode portion
220, 221: light blocking member
222: spacer
230: color filter
261: protrusion
270: opposed electrode
DAM1, DAM2, DAM3, DAM4: dam

What is claimed is:
1. A liquid crystal display comprising:
a first substrate including a display area, and a peripheral area outside the display area, the display area including a plurality of unit regions in a plan view of the liquid crystal display;
a thin film transistor over the first substrate;
a liquid crystal layer over the first substrate, the liquid crystal layer including a plurality of liquid crystal molecules;
a unit electrode positioned at one unit region of the plurality of unit regions and connected to the thin film transistor;
at least one lower dam positioned at a peripheral area, and positioned between the first substrate and the liquid crystal layer; and
a protrusion positioned at an edge region of the one unit region in the plan view of the liquid crystal display, and positioned between the first substrate and the liquid crystal layer and at an upper layer than the unit electrode, the protrusion protruding toward the liquid crystal layer,
wherein, in the plan view of the liquid crystal display:
the protrusion extends along the edge region of the one unit region to form a closed line around the one unit region,
the protrusion includes:
a transverse portion extending in a first direction;
a longitudinal portion extending in a second direction perpendicular to the first direction, and connected to the transverse portion; and
a corner portion connected to the transverse portion and the longitudinal portion,
the corner portion includes:
a first side extending in the first direction and connected to the transverse portion;
a second side extending in the second direction and connected to the longitudinal portion; and
a third side extending in an oblique direction with an acute angle being formed between the third side and the first side in the plan view of the liquid crystal display, and
the lower dam and the protrusion are positioned at a same layer and include the same material as each other.

2. The liquid crystal display of claim 1, wherein
the protrusion includes a first lateral surface obliquely inclined with respect to a bottom surface of the protrusion in a cross-sectional view, and
the liquid crystal molecules positioned around the first lateral surface are pretilted with respect to a normal direction of a surface of the first substrate.

3. The liquid crystal display of claim 2, wherein
the lower dam includes a first dam adjacent to the display area in the plan view and a second dam positioned between the first dam and an edge of the first substrate.

4. The liquid crystal display of claim 3, further comprising a first alignment layer positioned between the lower dam and the liquid crystal layer and between the protrusion and the liquid crystal layer.

5. The liquid crystal display of claim 4, further comprising a spacer that is positioned at a same layer as the protrusion and the lower dam, includes a same material as the protrusion and the lower dam, and has a top surface that is higher than a top surface of the protrusion and the lower dam.

6. The liquid crystal display of claim 5, wherein
the protrusion, the lower dam, and the spacer include a light blocking material.

7. The liquid crystal display of claim 6, further comprising a main light blocking portion having a top surface that is lower than the top surface of the spacer, and
the main light blocking portion is positioned at a same layer as the protrusion, the lower dam, and the spacer and includes a same material as the protrusion, the lower dam, and the spacer.

8. The liquid crystal display of claim 2, further comprising:
a second substrate opposing the first substrate with the liquid crystal layer interposed therebetween;
a sealant positioned between the first substrate and the second substrate and positioned in the peripheral area in the plan view; and at least one upper dam positioned in the peripheral area in the plan view, positioned between the second substrate and the liquid crystal layer, and protruded toward the liquid crystal layer.

9. The liquid crystal display of claim 8, further comprising a second alignment layer positioned between the upper dam and the liquid crystal layer.

10. The liquid crystal display of claim 9, further comprising
a spacer that is positioned at a same layer as the upper dam, includes a same material as the upper dam, and has a top surface that is higher than a top surface of the upper dam.

11. The liquid crystal display of claim 9, further comprising
a spacer that is positioned at a same layer as the protrusion and the lower dam, includes a same material as the protrusion and the lower dam, and has a top surface that is higher than a top surface of the protrusion and the lower dam.

12. The liquid crystal display of claim 1, wherein the protrusion includes:
a pair of the transverse portions opposing each other with respect to a center of the unit electrode and respectively including a side parallel to the first direction; and
a pair of the longitudinal portions opposing each other with respect to the center of the unit electrode and respectively including a side parallel to the second direction.

13. The liquid crystal display of claim 12, wherein
the cross-sectional lateral surface of the corner portion forms an angle of about 1 degree to about 2 degrees with a bottom surface of the protrusion.

14. The liquid crystal display of claim 12, wherein
the unit region includes a plurality of sub-regions in which the liquid crystal molecules are inclined in different directions from each other when an electric field is generated in the liquid crystal layer,
the unit electrode includes a stem portion positioned at a boundary between adjacent sub-regions and a plurality of branch portions connected to the stem portion, and
the branch portion extends in a different direction from the first direction and the second direction.

15. The liquid crystal display of claim 14, wherein
the unit electrode includes at least one flat portion respectively positioned in at least one corner of the unit electrode.

16. The liquid crystal display of claim 1, wherein
the first substrate has a curved surface.

17. The liquid crystal display of claim 1, wherein the protrusion has a closed-loop structure enclosing a center of the unit electrode.

18. The liquid crystal display of claim 1, wherein the first side is directly connected to the transverse portion in the plan view of the liquid crystal display, and wherein the second side is directly connected to each of the longitudinal portion and the first side in the plan view of the liquid crystal display.

19. The liquid crystal display of claim 1, wherein the third side is directly connected to at least one of the traverse portion and the longitudinal portion.

20. The liquid crystal display of claim 1, wherein the first side, the second side, and the third side form a triangular structure in the plan view of the liquid crystal display.

* * * * *